(12) United States Patent
Michaud et al.

(10) Patent No.: US 12,555,609 B2
(45) Date of Patent: Feb. 17, 2026

(54) MASKING IN VIDEO STREAM

(71) Applicant: GENETEC INC., St-Laurent, CA (US)

(72) Inventors: Francis Michaud, Varennes (CA); Mathieu Nadeau, Montreal (CA); Jonathan Doyon, Saint-Laurent (CA)

(*) Notice: Subject to any disclaimer, the term of this patent is extended or adjusted under 35 U.S.C. 154(b) by 696 days.

(21) Appl. No.: 17/209,977

(22) Filed: Mar. 23, 2021

(65) Prior Publication Data
US 2021/0218907 A1  Jul. 15, 2021

Related U.S. Application Data

(63) Continuation of application No. 16/341,497, filed as application No. PCT/CA2017/051217 on Oct. 13, 2017, now Pat. No. 10,991,397.
(Continued)

(51) Int. Cl.
*G11B 27/00* (2006.01)
*G08B 13/196* (2006.01)
(Continued)

(52) U.S. Cl.
CPC ...... *G11B 27/036* (2013.01); *G08B 13/19686* (2013.01); *G11B 27/00* (2013.01);
(Continued)

(58) Field of Classification Search
CPC ...... H04N 5/2628; H04N 5/272; H04N 5/783; H04N 21/4318; H04N 21/44008;
(Continued)

(56) References Cited

U.S. PATENT DOCUMENTS 6,493,872 B1  12/2002  Rangan et al.
6,509,926 B1  1/2003  Mills et al.
(Continued)

FOREIGN PATENT DOCUMENTS

EP  2709057 A2  3/2014
JP  2010233133 A  10/2010
JP  2018061212 A  4/2018

OTHER PUBLICATIONS

Munchurl Kim et al., Moving object segmentation in video sequences by user interaction and automatic object tracking, Image and Vision Computing, vol. 19, Issue 5, Apr. 1, 2001, pp. 245-260.
(Continued)

*Primary Examiner* — Daquan Zhao
(74) *Attorney, Agent, or Firm* — Anglehart et al.

(57) ABSTRACT

Methods and devices for combining a mask with a selectively progressing video stream may include receiving a selection of at least one mask with a mask zone that obscures at least a portion of the video stream. The methods and devices may include receiving a selection to emplace the at least one mask at a first location within the video stream. The methods and devices may include receiving a selection to enable a tracking icon to move the at least one mask to a second location within the video stream while the video stream progresses. The methods and devices may include generating a combined output of the video stream and the selective emplacement and movement of the at least one mask during the video stream progression.

27 Claims, 19 Drawing Sheets

Related U.S. Application Data

(60) Provisional application No. 62/408,610, filed on Oct. 14, 2016.

(51) Int. Cl.

| | | |
|---|---|---|
| *G11B 27/031* | (2006.01) | |
| *G11B 27/036* | (2006.01) | |
| *G11B 27/10* | (2006.01) | |
| *G11B 27/34* | (2006.01) | |
| *H04N 5/262* | (2006.01) | |
| *H04N 5/272* | (2006.01) | |
| *H04N 5/783* | (2006.01) | |
| *H04N 21/431* | (2011.01) | |
| *H04N 21/44* | (2011.01) | |
| *H04N 21/4545* | (2011.01) | |
| *G06F 3/04817* | (2022.01) | |

(52) U.S. Cl.
CPC .......... *G11B 27/031* (2013.01); *G11B 27/102* (2013.01); *G11B 27/34* (2013.01); *H04N 5/262* (2013.01); *H04N 5/2628* (2013.01); *H04N 5/272* (2013.01); *H04N 5/783* (2013.01); *H04N 21/4318* (2013.01); *H04N 21/44008* (2013.01); *H04N 21/45455* (2013.01); *H04N 21/45457* (2013.01); *G06F 3/04817* (2013.01)

(58) Field of Classification Search
CPC ....... H04N 21/45455; H04N 21/45457; H04N 5/95; H04N 9/88; H04N 5/93; G11B 27/036; G11B 27/00
USPC ............. 386/278, 280, 282; 348/169, 208.14
See application file for complete search history.

(56) References Cited

U.S. PATENT DOCUMENTS

| | | | |
|---|---|---|---|
| 6,959,099 | B2 | 10/2005 | Gutta et al. |
| 8,098,904 | B2 | 1/2012 | Ioffe et al. |
| 8,099,462 | B2 | 1/2012 | Sheng et al. |
| 8,139,083 | B2 | 3/2012 | de Leon |
| 8,610,787 | B2 | 12/2013 | Namba et al. |
| 8,977,003 | B1 | 3/2015 | Kwan et al. |
| 9,083,850 | B1 | 7/2015 | Higgs |
| 9,478,033 | B1 | 10/2016 | Safreed et al. |
| 9,519,950 | B2 | 12/2016 | Okada et al. |
| 9,646,222 | B1 * | 5/2017 | Conway .................... G06T 7/11 |
| 10,026,448 | B2 | 7/2018 | Koide et al. |
| 10,269,155 | B1 * | 4/2019 | Brailovskiy ....... H04N 1/00167 |
| 10,825,187 | B2 | 11/2020 | Wang et al. |
| 10,986,314 | B2 | 4/2021 | Shim et al. |
| 10,991,397 | B2 | 4/2021 | Michaud et al. |
| 11,232,817 | B2 | 1/2022 | Michaud et al. |
| 11,756,587 | B2 | 9/2023 | Michaud et al. |
| 2003/0007006 | A1 | 1/2003 | Baar et al. |
| 2003/0108240 | A1 | 6/2003 | Gutta et al. |
| 2004/0036767 | A1 | 2/2004 | Yajima |
| 2004/0039934 | A1 | 2/2004 | Land et al. |
| 2005/0068437 | A1 | 3/2005 | Hayasaka |
| 2005/0137958 | A1 | 6/2005 | Huber et al. |
| 2005/0275723 | A1 | 12/2005 | Sablak et al. |
| 2006/0008157 | A1 | 1/2006 | Hagita |
| 2006/0026628 | A1 | 2/2006 | Wan et al. |
| 2006/0028488 | A1 | 2/2006 | Gabay et al. |
| 2006/0177198 | A1 | 8/2006 | Jarman et al. |
| 2008/0019576 | A1 | 1/2008 | Senftner et al. |
| 2008/0036789 | A1 | 2/2008 | de Leon |
| 2009/0202114 | A1 | 8/2009 | Morin et al. |
| 2009/0207269 | A1 | 8/2009 | Yoda |
| 2010/0119177 | A1 | 5/2010 | Suzuki |
| 2010/0182447 | A1 | 7/2010 | Namba et al. |
| 2011/0150327 | A1 | 6/2011 | Yoo et al. |
| 2011/0161999 | A1 | 6/2011 | Klappert et al. |
| 2011/0188836 | A1 | 8/2011 | Popkiewicz et al. |
| 2012/0092348 | A1 | 4/2012 | McCutchen |
| 2012/0098854 | A1 | 4/2012 | Ohnishi |
| 2012/0230596 | A1 | 9/2012 | Watanabe et al. |
| 2012/0251078 | A1 | 10/2012 | Leichter et al. |
| 2013/0108105 | A1 | 5/2013 | Yoo et al. |
| 2013/0120442 | A1 | 5/2013 | Dhawan |
| 2013/0298004 | A1 | 11/2013 | Kranzberg et al. |
| 2014/0023248 | A1 | 1/2014 | Yoo et al. |
| 2014/0029804 | A1 | 1/2014 | Kawaguchi |
| 2014/0029920 | A1 | 1/2014 | Sitrick |
| 2014/0078172 | A1 | 3/2014 | Systrom et al. |
| 2014/0139609 | A1 | 5/2014 | Lu et al. |
| 2014/0328574 | A1 | 11/2014 | Sandberg et al. |
| 2014/0347475 | A1 | 11/2014 | Divakaran et al. |
| 2015/0248774 | A1 | 9/2015 | Sasaki |
| 2015/0326968 | A1 | 11/2015 | Shigenaga et al. |
| 2015/0328082 | A1 | 11/2015 | Jiang et al. |
| 2016/0066036 | A1 | 3/2016 | Felt et al. |
| 2016/0155465 | A1 | 6/2016 | Park et al. |
| 2016/0294781 | A1 | 10/2016 | Ninan et al. |
| 2016/0307600 | A1 | 10/2016 | Koide et al. |
| 2017/0018289 | A1 | 1/2017 | Morgenstern |
| 2017/0034523 | A1 | 2/2017 | Ebrahmi et al. |
| 2017/0094019 | A1 | 3/2017 | Ahmed et al. |
| 2017/0118495 | A1 | 4/2017 | Yang et al. |
| 2017/0192651 | A1 | 7/2017 | Yang et al. |
| 2018/0101723 | A1 * | 4/2018 | Wakako ............... G06V 10/235 |
| 2018/0182145 | A1 | 6/2018 | Imoto et al. |
| 2018/0225476 | A1 | 8/2018 | Siracusano, Jr. |
| 2018/0234665 | A1 | 8/2018 | Shim et al. |
| 2019/0066279 | A1 | 2/2019 | Monkarsh |
| 2019/0268537 | A1 | 8/2019 | Jang |
| 2020/0193559 | A1 | 6/2020 | Sano et al. |

OTHER PUBLICATIONS

The corresponding U.S. Appl. No. 17/209,873 Office Action dated Jun. 9, 2021.
International application No. PCT/CA2017/051217 International Preliminary Report on Patentability Chapter I dated Apr. 16, 2019.
International application No. PCT/CA2017/051217 International Search Report dated Jan. 30, 2018.
International application No. PCT/CA2017/051217 Search Strategy dated Jan. 30, 2018.
International application No. PCT/CA2017/051217 Written Opinion of the International Searching Authority dated Jan. 30, 2018.
European patent application No. 17860736.2 extended European search report and search opinion dated May 25, 2020.
European patent application No. 17860736.2 European search report and search opinion dated Mar. 29, 2022.
Corresponding U.S. Appl. No. 17/550,056 non-final rejection dated Mar. 9, 2023.
Corresponding European patent application No. 17860736.2 European examination report (summons) dated Mar. 22, 2023.
Corresponding European patent application No. 17860736.2 Minutes of the oral proceedings dated Sep. 28, 2023. (claims provided).
Corresponding European patent application No. 24151067.6 extended European search report dated Apr. 2, 2024.
Corresponding U.S. Appl. No. 18/362,024 Notice of Allowance dated May 1, 2024.
Corresponding U.S. Appl. No. 18/362,024 Office Action dated Jan. 21, 2024.
Corresponding European patent application No. 17860736.2 Decision to grant a European patent dated Jan. 15, 2024. (granted application text attached herewith).

* cited by examiner

MASKING IN VIDEO STREAM

RELATED APPLICATIONS

The present patent application is a U.S. continuation application of U.S. patent application Ser. No. 16/341,497 with a filing date of Oct. 13, 2017, that claims priority of U.S. provisional patent application No. 62/408,610 with a filing date of Oct. 14, 2016, the entireties of which are incorporated herein by reference.

BACKGROUND

Masking is used to obscure portions of a video image stream, such as a video file stored in a computer-readable memory. For various reasons, it may be necessary to mask certain portions of a video to obscure an object. For example, security footage may include private information, such as license plates and faces, that need to be obscured to allow publishing in a manner that would otherwise violate privacy. With the advent of body cameras, this need raised an increasing concern, since such cameras can capture a large number of private individuals without their consent, for example. When the footage is used in a public manner, it is often necessary to obscure people's faces, address markers, or other objects, for privacy concerns.

To this end, a mask can be added to the video over the object to be obscured. Currently, such masking is generally emplaced frame-by-frame manually. Automated object (e.g., face or license plate) recognition algorithms exist; however, these systems do not have enough accuracy and reliability to ensure complete coverage in every frame. Moreover, among other problems in the related art, certain objects may be hard or impossible to detect automatically, and it may be necessary at times to obscure objects unknown to such algorithms or portions of an image stream that have poorly defined boundaries.

Thus, there remains an unmet need for improved image stream masking technologies.

SUMMARY

The following presents a simplified summary of one or more implementations in accordance with aspects of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a method for combining a mask with a selectively progressing video stream. The method may include receiving a selection of at least one mask with a mask zone that obscures at least a portion of the video stream. The method may include receiving a selection to emplace the at least one mask at a first location within the video stream. The method may include receiving a selection to enable a tracking icon to move the at least one mask to a second location within the video stream while the video stream progresses. The method may include generating a combined output of the video stream and the selective emplacement and movement of the at least one mask during the video stream progression.

Another example implementation relates to a computer device. The computer device may include a memory to store data and instructions, a processor in communication with the memory, and a video editor application accessible via the memory and processor. The video editor application may be operable to receive a selection of at least one mask with a mask zone that obscures at least a portion of the video stream; receive a selection to emplace the at least one mask at a first location within the video stream; receive a selection to enable a tracking icon to move the at least one mask to a second location within the video stream while the video stream progresses; and generate a combined output of the video stream and the selective emplacement and movement of the at least one mask during the video stream progression.

Another example implementation relates to computer-readable medium storing instructions executable by a computer device. The computer-readable medium may include at least one instruction for causing the computer device to receive a selection of at least one mask with a mask zone that obscures at least a portion of the video stream. The computer-readable medium may include at least one instruction for causing the computer device to receive a selection to emplace the at least one mask at a first location within the video stream. The computer-readable medium may include at least one instruction for causing the computer device to receive a selection to enable a tracking icon to move the at least one mask to a second location within the video stream while the video stream progresses. The computer-readable medium may include at least one instruction for causing the computer device to generate a combined output of the video stream and the selective emplacement and movement of the at least one mask during the video stream progression.

Additional advantages and novel features relating to implementations in accordance with aspects of the present disclosure will be set forth in part in the description that follows, and in part will become more apparent to those skilled in the art upon examination of the following or upon learning by practice thereof.

DETAILED DESCRIPTION

Aspects of the present disclosure provide systems and methods for selective contemporaneous tracking of objects within progressing video streams, for example, to mask and/or highlight the objects (such masking and/or highlighting being interchangeably and/or collectively referred to herein by masking). In one example implementation, a user may use a mouse, or other input device, and a special icon superimposably displayed over progressing image frames in a video stream, which may be used to define a size and/or shape of a mask to insert over one or more objects and/or portions thereof. The user may selectively move the mask so as to follow the movement of the object in a video stream, for example, and the video stream and moving object may be combined into a combined video output. In an implementation, the system may automatically follow the objects with the mask, for example, and the video stream and moving objects may be combined into a combined video output. When the combined video output is then played, the object may appear as being hidden behind the mask throughout a portion or all of the outputted video stream. The systems and methods provide a mode to record such masks positions from frame to frame and to maintain the metadata associated with the mask positions in a database for further playback or export operations where the masking objects may be required.

Masking may be required in various situations, for example, when a video sequence is to be released to the public with the aim to gather additional information about a crime, or when the information (e.g., license plate) shown in a video sequence must be kept private by law enforcement or other parties for privacy reasons, whether the video is released to the public or not. In such situations, certain portions of the video, also interchangeably referred to herein as "objects" (e.g., individuals, license plates, or other identifying information or any other selected video frame portion or portions) shown in the video, may need to be masked when distributed to the public.

Highlighting may also be useful in various situations, for example, when a video sequence is to be released to the public with the aim to gather additional information about a crime and/or there is otherwise a need to bring the attention of the viewers to different elements of the video sequence by highlighting them with a bounding box around them.

The described devices and methods in accordance with aspects of the present disclosure may facilitate allowing a user to easily move a mask over a playing video while the video is progressing, so as to track with an identified object in motion and provide controllable playback of the video. As such, users without advanced video editing knowledge or experience may easily create such combined masked output videos, and less time may be expended when redacting videos, while ensuring accurate results.

Figure 1:
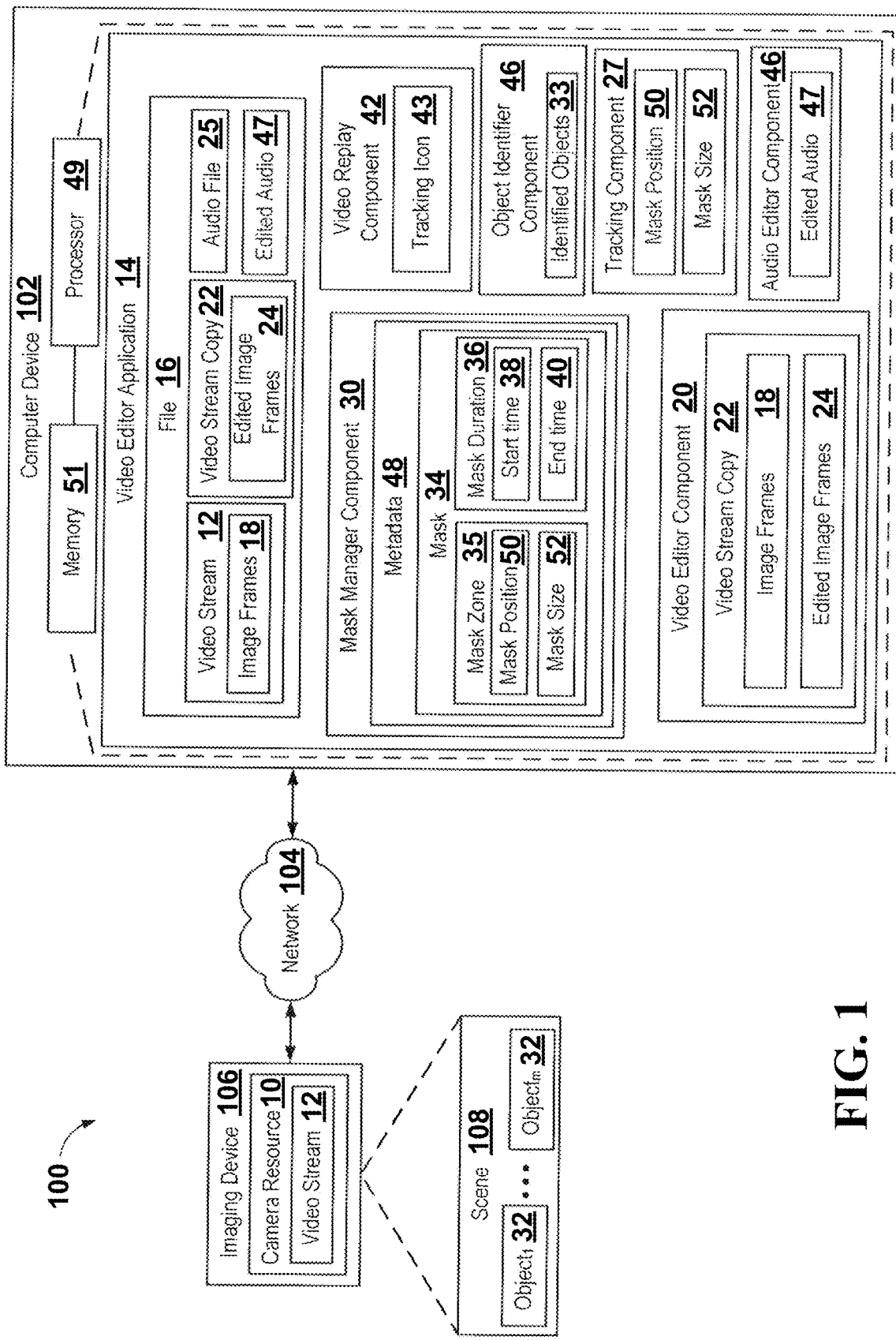
FIG. 1 is a schematic block diagram of an example computer device in accordance with aspects of the present disclosure.
Figure 2:
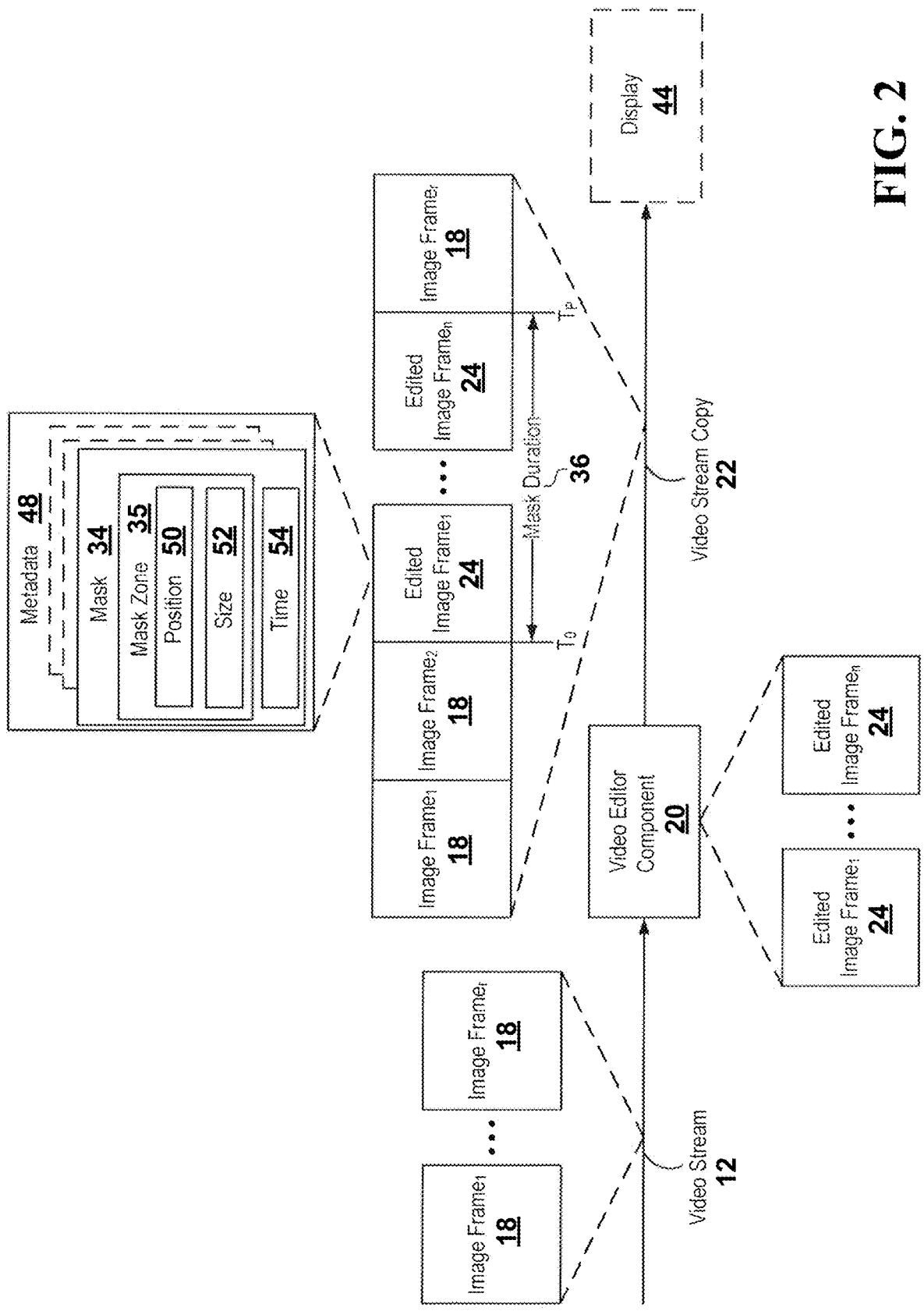
FIG. 2 is a schematic block diagram of an example of processing a video stream copy in accordance with aspects of the present disclosure.

Referring now to FIG. 1, an example system 100 for editing videos by masking and/or highlighting objects 32 in a video stream 12 may include one or more imaging devices 106 in communication with computer device 102, such as via a network 104 (e.g., the Internet or an intranet) and/or a communication link with a communication component. Imaging device 106 may include one or more camera resources 10 that may capture a video, such as a video stream 12 and/or still picture of scene 108 that may be presented on a display 44 (FIG. 2). Display 44 may be located on imaging device 106, computer device 102 and/or a device remote to computer device 102. Imaging device 106 may include any device that may be used to capture and/or manipulate images, video, and video-related functionality, such as, but not limited to, body cameras, surveillance cameras, desktop video cameras (webcams), mobile devices, digital camcorders, still image cameras that support video streaming, or any device having one or more camera resources 10.

Imaging device 106 may capture one or more image frames 18 in a video stream 12 of a plurality of objects 32 up to m objects (where m is a positive number) of scene 108. Imaging device 106 may transmit video stream 12 to computer device 102. In an example implementation, imaging device 106 may automatically transmit video stream 12 to computer device 102. For example, a body worn camera and/or an in vehicle surveillance system may automatically transmit video streams 12 captured by the body worn camera and/or vehicle surveillance system to computer device 102. In addition, a user of system 100 may upload to or otherwise access one or more video streams 12 via computer device 102. For example, a user may select one or more video streams 12 to upload to computer device 102. Example formats of video streams 12 may include, but are not limited to, G64, MP4, AVI, ASF, MOV, WMV, WebM, Ogg, Wav, jpg, jpeg, png, gif, and tiff.

Computer device 102 may include any mobile or fixed computer device, which may be connectable to a network. Computer device 102 may be or include, for example, a computer device, such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may store the received video streams 12 in one or more files 16. For example, computer device 102 may store related video streams 12 in a single file 16. Related video streams 12 may include, but are not limited to, video streams of a same event, video streams of a same location, video streams received from the same imaging device 106, and/or video streams of a same object. As such, one or more video streams 12 may be stored in a respective file 16. One example use case may include creating a case file 16 for a crime and/or incident with several video streams 12 from one or more imaging devices 106 capturing the crime and/or incident from differing vantage points.

Computer device 102 may include a video editor application 14 executed by processor 49 and/or memory 51 of computer device 102. Memory 51 may be configured for storing data and/or computer-executable instructions defining and/or associated with video editor application 14, and processor 49 may execute video editor application 14. An example of memory 51 can include, but is not limited to, a type of memory usable by a computer, such as random access memory (RAM), read only memory (ROM), tapes, magnetic discs, optical discs, volatile memory, non-volatile memory, and any combination thereof. An example of processor 49 can include, but is not limited to, any processor specially programmed as described herein, including a controller, microcontroller, application specific integrated circuit (ASIC), field programmable gate array (FPGA), system on chip (SoC), or other programmable logic or state machine.

Video editor application 14 may provide a user interface that may display outputs and/or accept inputs and/or commands from a user of system 100. The user interface may provide a user the ability to view and/or edit video streams 12. For example, a user may use video editor application 14 to mask selected individuals and/or objects of interest in a progressing video stream 12, while, for example, avoiding a need to stop at each frame in order to redact content. In addition, a user may use video editor application 14 to redact audio in progressing video stream 12.

In one example, a user may open video editor application 14 by opening a file 16 and selecting a menu icon to redact a selected video stream 12. Upon selecting the icon to redact a video stream 12, video editor application 14 may open a user account. Another example may include a user opening video editor application 14 by directly accessing a user account for video editor application 14. Different user accounts may have varying levels of permission that may be granted to users. For example, permission levels may define access to available functionality and restrict specific users to view-only or edit-only rights. Moreover, permission levels may restrict access to specific video streams 12.

Video editor application 14 may include a video editor component 20 that may make a video stream copy 22 of the selected video stream 12 before performing any redaction and/or editing of the video stream 12. A user may have multiple video stream copies 22 with different redactions created for the original video stream 12. As such, any changes and/modifications made during the editing process may be made to video stream copy 22 and the original video stream 12 may remain unchanged.

A video replay component 42 may display a video stream copy 22 for a user. A user may select to pause video stream copy 22 when one or more objects 33 are identified in the image frame 18 that are selected to be obscured and/or blurred by a mask. For example, a user may identify a face of a selected individual and/or a license plate of a vehicle to be obscured and/or blurred in the image frame 18. In addition, video replay component 42 may present one or more image frames 18 of video stream copy 22 on a display. A user may select an image frame 18 to edit when one or more objects 33 are identified in the image frame 18 that may need to be obscured and/or blurred.

Once the video stream copy 22 is paused, for example, video editor application 14 may allow a user to select one or more masks 34 to insert into video stream copy 22. Masks 34 may be added to the video stream copy 22 to obscure and/or blur one or more identified objects 33 in the scene 108 displayed in video stream copy 22. For example, a user may select an icon to add a new mask 34 to the image frame 18. The user may specify a shape (e.g., rectangle, square, triangle, circle, and oval) of the mask 34. Each mask 34 selected by the user may be the same shape and/or a different shape may be used for differing masks 34. As such, a variety of masking shapes may be used in a single image frame 18 for masks 34.

In addition, a mask zone 35 may be defined for each mask 34 selected. The mask zone 35 may identify the mask size 52 and/or mask position 50 in an image frame 18 of video stream copy 22. For example, a user may move the mask zone 35 to a location covering the one or more objects 32 in the image frame 18 and may selectively adjust the size of the mask zone 35 to obscure the one or more objects 32, for example, by selecting a tracking icon 43. The mask size 52 and position 50 may be altered as the video stream progresses. For example, the user may also resize mask size 52 without pausing the video, such as by selecting one or more predetermined shortcut keys, to increment and decrement the width and height of the mask 34 by a predetermined amount. One example may include a user using up and down arrow keys to adjust the height of the mask 34 (e.g., an up arrow to increase the height and a down arrow key to decrease the height). In addition, a user may use the right and left arrow keys to adjust the width of the mask 34.

The mask zone 35 may also be used on any region in an image frame 18, whether depicting a particular object 32 or not. For example, in a moving pan of a particular scene 108, a mask zone 35 may be used to outline or obscure a portion of each frame that represents a particular location in the scene 108 displayed in the video stream as the relative location of changes with changes in frame perspective over time, e.g., such location may serve as a reference location.

In an example implementation, video editor application 14 may include an object identifier component 45 that may automatically identify one or more objects 33 in the video stream copy 22 to obscure and/or blur and may automatically select one or more masks 34 to insert into the video stream copy 22 over the identified objects 33. One or more facial recognition systems or other object recognition system, for example, may be used to identify one or more objects 33 to obscure and/or blur in the video stream copy 22. For example, mask 34 may be automatically applied on all faces detected in video stream copy 22 using one or more facial recognition systems. A user may edit and/or modify the one or more masks 34 automatically inserted into the video stream copy 22. For example, a user may remove masks 34 from persons of interest and/or add masks 34 to content not captured by the automatic process (e.g., partial faces, non-face related information, and/or sides of faces). By using an automatic process to perform an initial identification, as well as to persistently track such identified portions during video progression, the editing time to redact a video may be reduced.

When a mask 34 is added to an initial image frame 18, a mask duration 36 timeline may be may be initiated for presentation to the user interface corresponding to a duration of when the mask 34 is presented in the video stream copy 22. For example, a mask duration 36 may begin at a mask start time 38 that corresponds to a time marker in the video stream copy 22 when the mask 34 is first inserted into an image frame 18 within the video stream copy 22. In addition, the mask duration 36 may end at an end time 40 that corresponds to a time marker in the video stream copy 22 when the mask 34 is removed from an image frame 18. For each mask 34 inserted into the image frame 18, a different timeline for mask duration 36 may be presented. As such, a user may be able to visually determine time frames that different masks 34 are inserted in the video stream copy 22. Moreover, a user may modify a mask duration 36 by moving the presented timeline. For example, a user may extend and/or shorten the mask duration 36 by moving the start time 38 and/or end time 40 of the mask duration 36.

The interface may include a video replay component 42 that may receive an input via a tracking icon 43 to start replaying the video stream copy 22. For example, a user may select the same tracking icon 43 used to resize and/or move the mask 34 in order to start replaying the video stream copy 22. As the video stream copy 22 replays, a user may use the tracking icon 43 to move the mask 34 and follow any movement objects 32 may have during playing of the video stream copy 22. As the mask 34 moves, the mask zone 35 associated with mask 34 may be updated so that the mask position 50 and/or mask size 52 may be tracked over several image frames 18 of the video stream copy 22. Thus, a user may easily obscure one or more objects 32 over several image frames 18 while the video stream copy 22 continues to play at a specified speed (e.g., a selected frame rate per second for the video playback). In an implementation, a user may adjust the selected video playback speed by selecting one or more predetermined shortcut keys, to increment and/or decrement the playback speed by a predetermined amount. For example, a user may use up and down arrow keys to adjust the playback speed (e.g., an up arrow to increase the speed and a down arrow key to decrease the speed).

Video editor component 20 may thereby automatically generate edited image frames 24 for each image frame 18 where the mask(s) 34 are present and use the one or more masks 34 to obscure and/or blur identified objects 33. For example, video editor component 20 may apply a blurring effect, pixilation effect, and/or black box to modify the edited image frame 24 corresponding to the mask position 50 and mask size 52 so that identified objects 33 are not present in the edited image frame 24. As such, identified objects 33 may not be retrievable from video stream copy 22 once obscured and/or blurred by video editor component 20.

Video editor component 20 may also generate and save metadata 48 for each edited image frame 24. Metadata 48 may track any changes and/or modifications made to mask(s) 34 that may occur between edited images frames 24. Metadata 48 may include, but is not limited to, mask position 50, mask size 52, and/or mask duration 36. For example, metadata 48 may include a location vector associated with mask(s) 34 that may be used to track the various mask positions 50 of mask 34.

One example use case may include a user first selecting the tracking icon 43 associated with mask 34 and then maintain persistent selection of an input device, such as holding a mouse button or maintaining a finger placement on a touchscreen, to start the masking process for a progressing video. As long as the user selects the tracking icon 43, the video continues to progress (i.e., play). The user may move the input device and/or finger, and the mask 34 may correspondingly move so as to follow the same path as the input device. Thus, as identified object 33 moves, the user may follow with the input device and/or finger the moving identified object 33. The user may also resize mask 34 without pausing the video, such as by selecting one or more predetermined shortcut keys, to increment and decrement the width and height of the mask 34 by a predetermined amount (e.g., 5%).

Once the user releases the tracking icon 43, for example, by releasing the input device and/or removing a finger from the tracking icon 43 on a touch screen, the video playback may stop. In addition, the end time 40 of the mask duration 36 may correspond to the time within the video stream that the releasing the input device and/or removing a finger from the tracking icon 43 occurs. Video editor application 14 may track and record the movement of mask 34, for example, in metadata 48. When the user replays video stream copy 22 with the applied metadata, the user may see that, as the video copy plays, mask 34 follows the same path that the input device followed frame by frame.

At any moment during video streaming and editing operation, the user may select to click on, or otherwise select, the tracking icon 43 to correct and/or continue the tracking of mask 34. Changes and/or modifications made to mask 34 may overwrite the mask position 50 previously recorded for mask 34, if any, and/or a new recorded mask position 50 may be added to metadata 48 for mask 34. Thus, every time a new mask position 50 is recorded for mask 34, the mask position 50 may persist from the current time in the video stream copy 22 until the end time 40 of the mask duration 36 for mask 34, or, for example, until a different position for mask 34 may be set, whichever may come first.

At any moment during video streaming and editing operation, the user may pause the video playback to resize mask 34. For example, a user may resize mask 34 by dragging one of its sides. The user may also resize mask 34 without pausing the video playback by pressing shortcut keys to increment and/or decrement the width and height of mask 34 by a predetermined amount (e.g., 5%). The new width and height of mask 34 may be recorded in metadata 48, and mask 34 may retain these new dimensions from the current time in the video stream copy 22 until the end time 40 of the mask duration 36 for mask 34 or until a different mask size 52 may be set, for example, whichever comes first.

Thus, a user may easily obscure one or more objects 32 over several edited image frames 24 while the video stream copy 22 continues to play at a specified speed (e.g., a selected frame rate which to display the edited image frames 24), without having to pause the video stream copy 22 to see each frame and perform the editing separately on each frame, for example.

In an example implementation, a user may also select an audio file 25 associated with the video stream 12 to edit and/or modify. A user may want to remove a portion of the audio file 25 and/or modify a portion of the audio file 25, for example, so as to render the audio information unrecognizable. For example, a user may want to remove or modify audio associated with a specific speaker in the video stream 12. In addition, a user may want to remove and/or modify background noise that may identify where the video was captured and/or identify individuals located in the background of the video stream. Video editor application 14 may include an audio editor component 46 that allows a user to modify and/or change an audio file 25 and generate edited audio 47.

For example, a user may apply one or more masks 34 to obscure selected audio portions in the audio file 25. Each mask 34 may correspond to a different portion of the audio file 25 to remove and/or obscure the selected audio portion. The mask position 50 may indicate where in the audio file 25 the mask 34 may be inserted in order to remove the audio and/or obscure the audio to thereby render it unrecognizable. Audio editor component 46 may generate an output of edited audio 47 with the one or more masks 34 inserted into the audio. File 16 may associate the edited audio 47 with one or more video stream copies 22 and/or video streams 12.

Referring now to FIG. 2, illustrated is an example of various aspects of processing video stream copy 22. Video editor component 20 may receive a video stream 12 with one or more (e.g., 1 to r, where r is an integer) image frames 18. As discussed in FIG. 1, one or more masks 34 may be selected for addition to a video stream copy 22, and video editor component 20 may generate one or more (e.g., 1 to n, where n is an integer) edited image frames 24 with the selected masks 34 inserted therein.

Each mask 34 inserted into video stream copy 22 may include a mask duration 36 that corresponds to a time period when a mask 34 is present in edited image frames 24. For example, the mask duration 36 may occur after a start time 38 (e.g., time $T_0$ in FIG. 2) corresponding to a first edited image frame 24 where mask 34 is present (e.g., Edited Image Frame$_1$ in FIG. 2) and continues until an end time 40 (e.g., time $T_p$ in FIG. 2) corresponding to a last edited image frame 24 in which the mask 34 occurs (e.g., Edited Image Frame$_n$ in FIG. 2). When the mask duration 36 is completed (e.g., at Edited Image Frame$_n$), video editor component 20 may cease the generation and insertion of edited image frames 24 into video stream copy 22, and thus video stream copy 22 may again include only image frames 18 from video stream 12. As such, video stream copy 22 may include a combined mix of edited image frames 24 and image frames 18.

In addition, each edited image frame 24 where mask 34 occurs may also include metadata 48 associated with mask 34. Metadata 48 may include, but is not limited to, information regarding mask zone 35, such as the position 50 of mask 34 in the edited image frame 24, the size of mask 34, and/or information relating to time 54 corresponding to a time marker in the video stream copy 22 where mask 34 is located. When more than one mask 34 is present in an edited image frame 24, metadata 48 may be captured for each mask 34 inserted into the edited image frame 24. Moreover, if the mask zone 35 changes between edited image frames 24, the metadata 48 information may be updated. As such, the metadata 48 information 48 may track any changes to mask position 50 and/or mask size 52 between edited image frames 24. For example, metadata 48 may include a location vector associated with mask(s) 34 that may be updated when the various mask positions 50 of mask 34 change.

Video editor component 20 may apply a blurring effect, pixilation effect, and/or black box to modify the edited image frame 24 corresponding to the mask position 50 and/or mask size 52 so that identified objects 33 are not present in the edited image frame 24. As such, identified objects 33 may not be retrievable from video stream copy 22 once obscured and/or blurred by video editor component 20. For example, video editor component 20 may modify image information in the video stream to add the blurring effect, pixilation effect, and/or black bock corresponding to the mask position and/or mask size 52 so that the identified objects 33 are not present in the edited image frame 24. In addition, video editor component 20 may apply the blurring effect, pixilation effect, and/or black bock corresponding to the mask position and/or mask size 52 based on the metadata 48 associated with the mask 34.

Video stream copy 22 may be presented on display 44 when a user selects to replay the video stream copy 22. In addition, video stream copy 22 may be transmitted to other systems for further processing.

Figure 3:
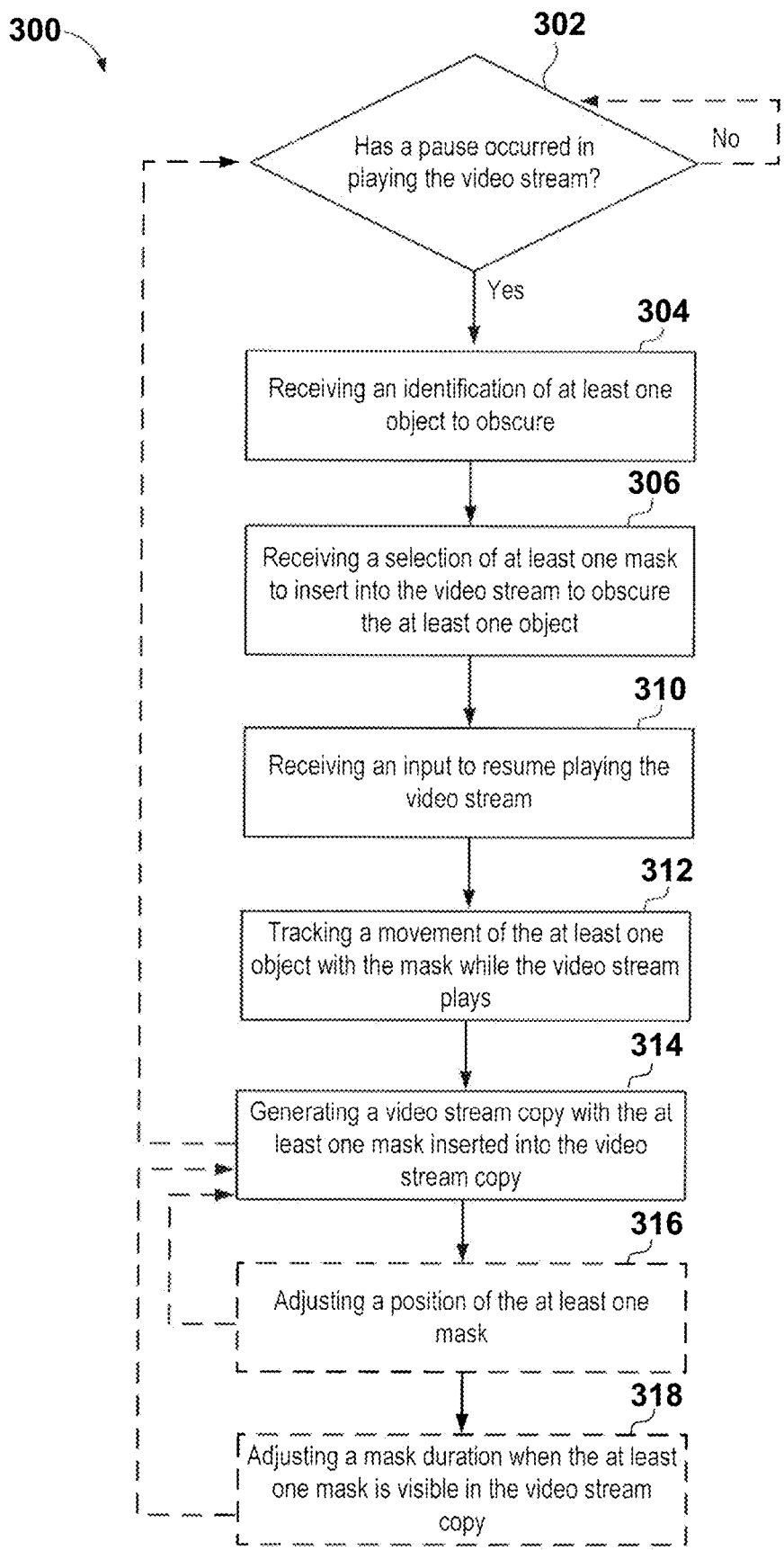
FIG. 3 is a flow chart of a method for masking objects in accordance with aspects of the present disclosure.

Referring now to FIG. 3, an example method 300 is illustrated for masking objects 32 (FIG. 1) that may be executed by video editor application 14 (FIG. 1) on computer device 102 (FIG. 1).

At 302, method 300 may include determining whether a pause occurred in playing the video stream. For example, as shown in FIG. 1, a video replay component 42 may play video stream copy 22 for viewing by a user. A user may select to pause video stream copy 22, for example, to view a scene more closely and/or when one or more objects 33 are identified in the image frame 18 that may need to be obscured and/or blurred. In addition, video replay component 42 may present one or more image frames 18 of video stream copy 22 on a display. A user may select an image frame 18 to edit when one or more objects 33 are identified in the image frame 18 that may need to be obscured and/or blurred.

At 304, method 300 may include receiving identification of at least one object to obscure. For example, as shown in FIG. 1, a user may identify a face of an individual and/or a license plate of a vehicle that may need to be obscured and/or blurred in the image frame 18. In an example implementation, video editor application 14 may automatically identify one or more objects 33 in the video stream copy 22 to obscure and/or blur. For example, one or more facial recognition algorithms or other object recognition system may be used to identify one or more objects 33 to obscure and/or blur in the video stream copy 22.

At 306, method 300 may include receiving a selection of at least one mask to insert into the video stream to obscure the at least one object. For example, as shown in FIG. 1, once the video stream copy 22 is paused, video editor application 14 may allow a user to select one or more masks 34 to insert into video stream copy 22. For example, a user may selectively emplace mask 34 at a first location within the video stream (e.g., a first location within an image frame 18 of the video stream). Masks 34 may be added to the video stream copy 22 to obscure and/or blur one or more identified objects 33 in the scene 108 captured in video stream copy 22. For example, a user may select an icon to add a new mask 34 to the image frame 18. The user may specify a shape (e.g., rectangle, square, triangle, circle, or oval) of the mask 34. Each mask 34 selected by the user may be the same shape and/or a different shape from other masks 34. As such, a variety of shapes may be used in a single image frame 18 for a plurality of masks 34.

In addition, a mask zone 35 may be defined for each mask 34 selected. The mask zone 35 may identify the mask size 52 and/or mask position 50 in an image frame 18 of video stream copy 22. For example, a user may move the mask zone 35 to a location covering the one or more objects 32 in the image frame 18 and may adjust the size of the mask zone 35 to obscure the one or more objects 32, for example, by selecting a tracking icon 43. The mask zone 35 may also be used on any region in an image frame 18, whether depicting a particular object 32 or not. Thus, each mask 34 may be associated with a persistent subportion of the video stream. The persistent subportion of the video stream may comprise at least a portion of a particular object 32 visible within the visible video stream. For example, in a moving pan of a particular scene 108, a mask zone 35 may be used to outline or obscure a portion of each frame that represents a particular location in the scene 108 being video streamed as location position moves within the frame, e.g., using the location as a reference point. As such, the mask zone 35 may be used to outline or obscure at least a portion of the video stream.

In an example implementation, video editor application 14 may automatically select one or more masks 34 to insert into the video stream copy 22 over the identified objects 33. For example, automatic face detection tools may be used to automatically generate masks and may selectively emplace the masks at a first location within the video stream and selectively move the masks to a second location within the video stream to follow and blur faces in the video when movement of the faces occurs. A user may edit and/or modify the one or more masks 34 automatically inserted into the video stream copy 22 using, for example, tracking icon 43 to adjust the mask zone 35 associated with masks 34. By using automatically generated masks, time may be saved during the editing process.

At 310, method 300 may include receiving an input to resume playing the video stream. For example, as shown in FIG. 1, the interface may include a video replay component 42 that may receive an input via a tracking icon 43 to start replaying the video stream copy 22. For example, a user may select the same tracking icon 43 used to resize and/or move the mask 34 to start replaying the video stream copy 22. As the video stream copy 22 replays, a user may use the tracking icon 43 to move the mask 34 and follow any movement that objects 32 may have during playing of the video stream copy 22. For example, the user may selectively move mask 34 to a second location within the video steam when the video stream progresses to track any movement that objects 32 may have. As such, the movement of mask 34 may be linked to the movement of objects 32 may have when the video stream progresses. In an implementation, the movement of mask 34 may be automatically linked to the movement of objects 32 when the video stream progresses.

As the mask 34 moves, the mask zone 35 associated with mask 34 may be updated so that the mask position 50 and/or mask size 52 may be tracked over several edited image frames 24 of the video stream copy 22. For example, the user may also resize mask size 52 without pausing the video, such as by selecting one or more predetermined shortcut keys, to increment and decrement the width and height of the mask 34 by a predetermined amount. One example of predetermined shortcut keys may include using up and down arrow keys to adjust the height of the mask 34 (e.g., an up arrow to increase the height and a down arrow key to decrease the height). In addition, predetermined shortcut keys may include using the right and left arrow keys to adjust the width of the mask 34. Thus, a user may easily obscure one or more objects 32 over several edited image frames 24 while the video stream copy 22 continues to play at a specified speed (e.g., a selected frame rate at which to display the image frames 18), without having to pause the video stream copy 22 to perform the editing frame by frame, for example. In an addition, a user may adjust the selected video playback speed by selecting one or more predetermined shortcut keys, to increment and decrement the playback speed by a predetermined amount. For example, a user may use up and down arrow keys to adjust the playback speed (e.g., an up arrow to increase the speed and a down arrow key to decrease the speed).

Once the user releases the tracking icon 43, for example, by releasing the input device and/or removing a finger from the tracking icon 43 on a touch screen, the video playback may stop. In addition, the end time 40 of the mask duration 36 may correspond to releasing the input device and/or removing a finger from the tracking icon 43. Video editor application 14 may track and record the movement of mask 34, for example, in metadata 48. When the user replays video stream copy 22, the user may see that mask 34 follows the same path that the input device followed frame by frame as the video copy plays.

At 314, method 300 may include generating a video stream copy with the at least one mask inserted into the video stream copy. Video editor component 20 may generate edited image frames 24 for each image frame 18 where the mask(s) 34 are present and used to obscure and/or blur identified objects 33. For example, video editor component 20 may apply a blurring effect, pixilation effect, and/or black box to modify the edited image frame 24 corresponding to the mask position 50 and mask size 52, so that identified objects 33 are not present in the edited image frame 24. The identified objects 33 may not be retrievable from video stream copy 22 once obscured and/or blurred by video editor component 20. For example, video editor component 20 may modify image information in the video stream to add the blurring effect, pixilation effect, and/or black bock corresponding to the mask position and/or mask size 52 so that the identified objects 33 are not present in the edited image frame 24. In addition, video editor component 20 may apply the blurring effect, pixilation effect, and/or black bock corresponding to the mask position and/or mask size 52 based on the metadata 48 associated with the mask 34. As such, video editor component 20 may generate a combined output of the video stream copy 22 and the selective emplacement and movement of the mask 34 during the video stream progression.

Video editor component 20 may also generate and save metadata 48 for each edited image frame 24. Metadata 48 may track any changes and/or modifications made to mask(s) 34, for example, that may occur between edited images frames 24. Metadata 48 may include, but is not limited to, mask position 50, mask size 52, and/or mask duration 36. In addition, metadata 48 may be retained so as to enable a user can quit and/or pause an editing session and come back later without losing the recordings previously made for a mask 34.

At 316, method 300 may optionally include adjusting a position of the at least one mask. For example, as shown in FIG. 1, a user may click on, or otherwise select, the tracking icon 43 to correct and/or continue the tracking of mask 34. Changes and/or modifications made to mask 34 may overwrite the mask position 50 previously recorded for mask 34, if any, or a new recorded mask position 50 may be added to metadata 48 for mask 34. Thus, every time a new mask position 50 is recorded for mask 34, the mask position 50 may stay effective from the current time in the video stream copy 22 until the end time 40 of the mask duration 36 for mask 34 or until a different position for mask 34 may be set, for example, whichever may come first.

The user may also pause the video playback to resize mask 34 and/or reposition mask 34. For example, a user may resize mask 34 by dragging one of its sides. The user may also resize a mask by dragging it to a different position. The new X and Y coordinates of the mask position 50 may be recorded, and mask 34 may retain these new dimensions from the current time of the video until the end time 40 of mask 34 if there is not any other repositioning of the mask performed, for example. If some repositioning operations occur on mask 34, then the latest operations may overwrite the previous mask position 50.

The user may also resize mask 34 without pausing the video playback by pressing shortcut keys, for example, to increment and/or decrement the width and height of mask 34 by a predetermined amount (e.g., 5%). The new width and height of mask 34 may be recorded in metadata 48, and mask 34 may retain these new dimensions from the current time in the video stream copy 22 until the end time 40 of the mask duration 36 for mask 34 or until a different mask size 52 may be set, for example, whichever comes first.

At 318, method 300 may optionally include adjusting a mask duration when the at least one mask is visible in the video stream copy. For example, as shown in FIG. 1, a user may modify a mask duration 36 by moving the timeline information for the presented mask duration 36. For example, a user may extend and/or shorten the mask duration 36 by moving the start time 38 and/or end time 40 of the mask duration 36 on the presented timeline.

Once a user is satisfied with the masks 34 created and the tracking of the identified objects 33, the video editor application 14 may use a smoothing algorithm, for example, to avoid having a shaky trajectory for the masks 34. An example of a smoothing algorithm may include, but is not limited to, removing every mask 34 (or changes in position thereof) through all the recordings having a change in their mask position 50 (e.g., X and Y coordinates) of less than 1% of their previous recording, if any.

Figure 4A:
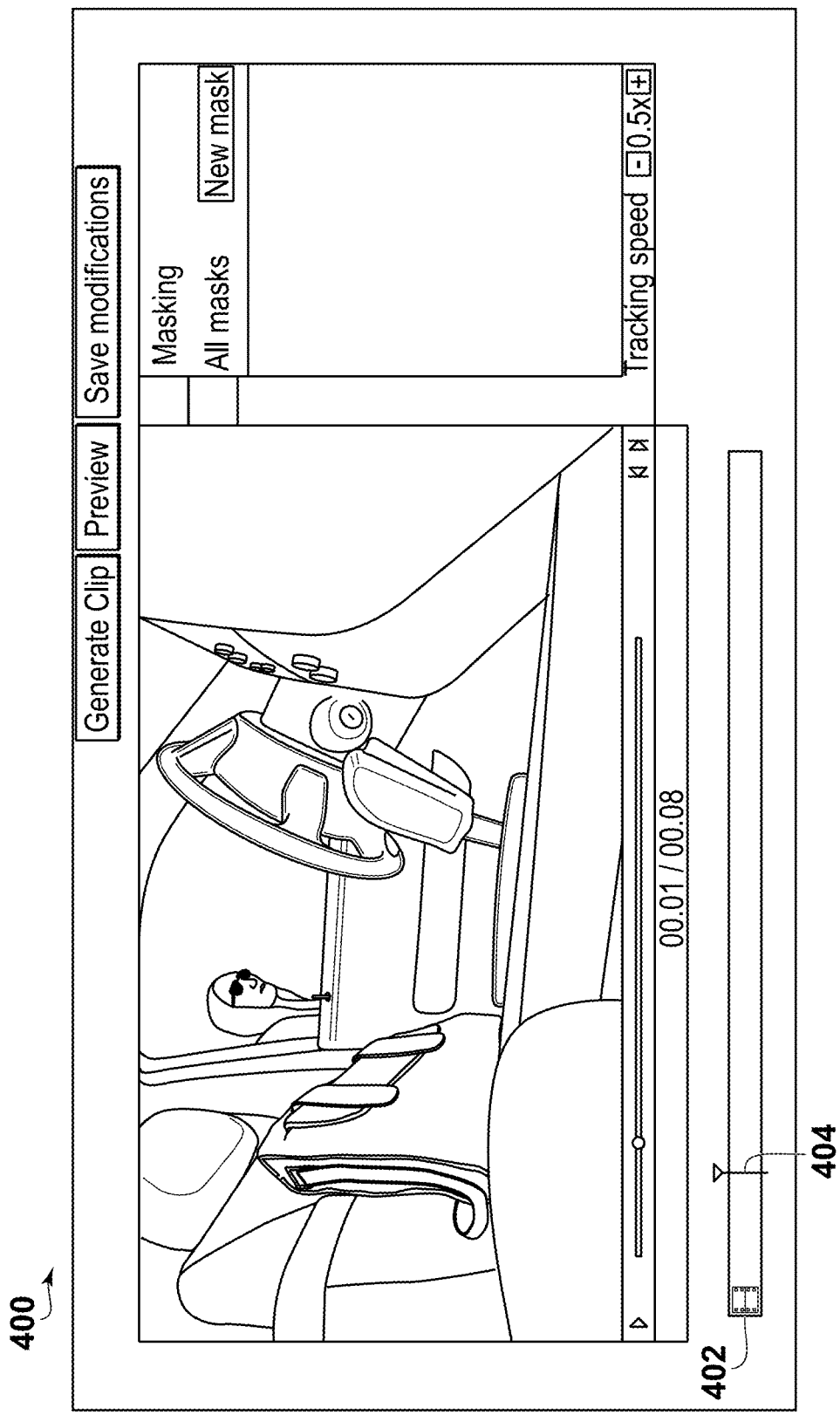
FIGS. 4A-4H illustrate example graphical user interfaces in accordance with aspects of the present disclosure.

Referring now to FIGS. 4A-4H, illustrated are example snapshots of graphical user interface screens in accordance with aspects of the present disclosure. FIG. 4A illustrates an example user interface 400 where a video sequence is paused. A video timeline 402 representing the video sequence may indicate at 404 where the video sequence is paused. A user may pause the video sequence, for example, when one or more objects may be identified in the image frame that may need to be obscured and/or blurred. For example, a user may identify a face of an individual and/or a license plate of a vehicle that may need to be obscured and/or blurred in the image frame.

Figure 4B:
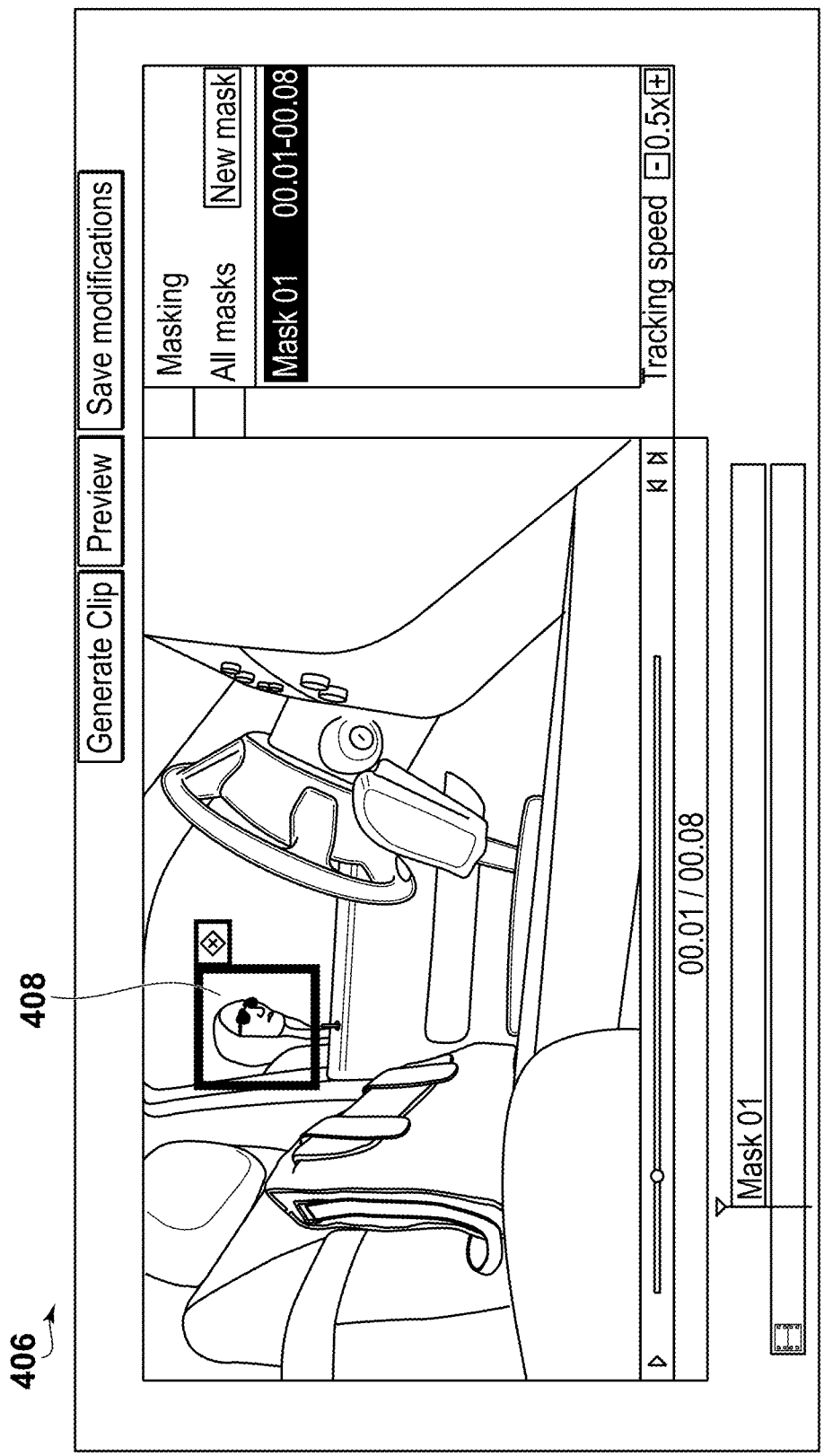
Figure 4C:
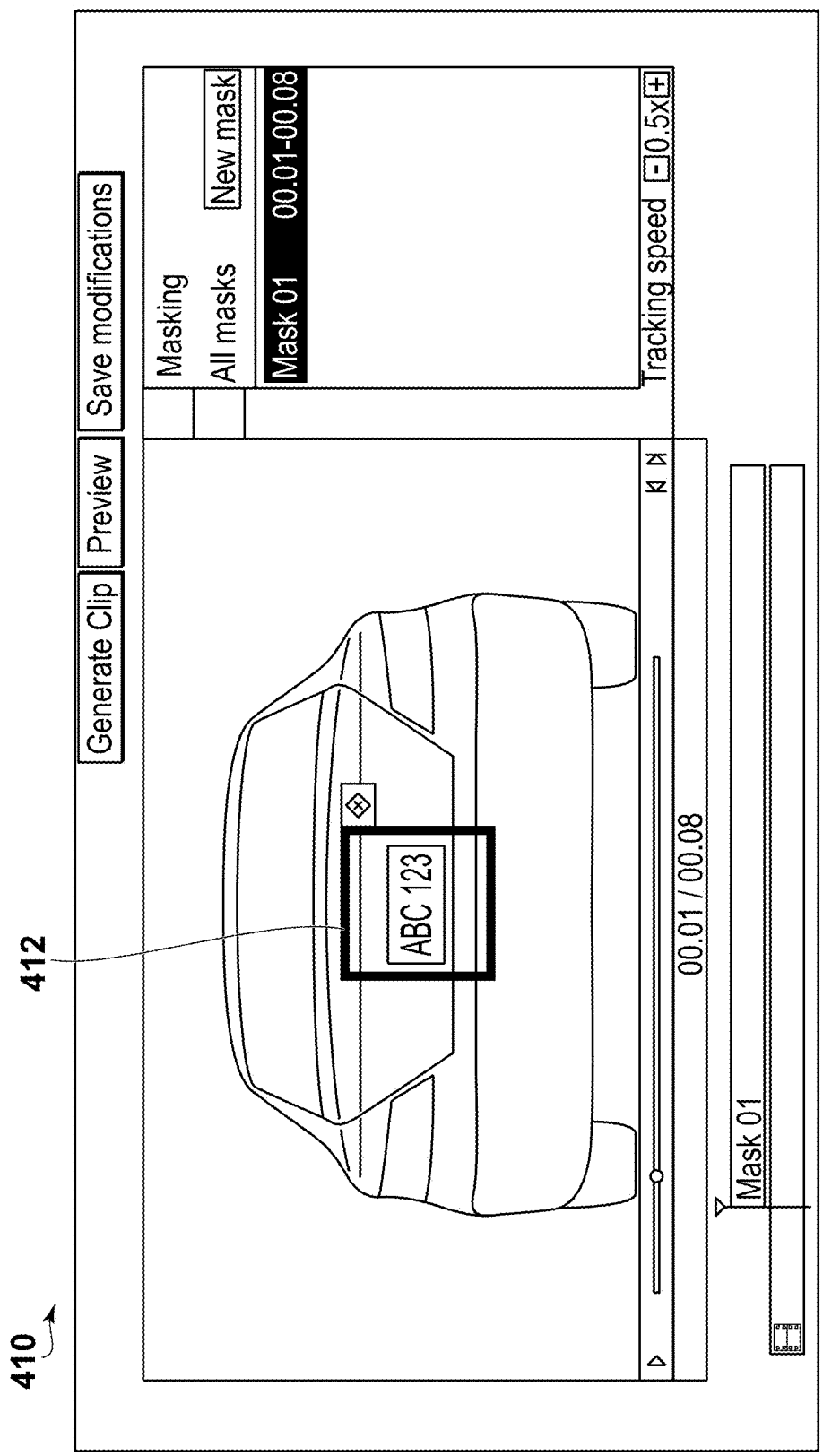

FIGS. 4B and 4C illustrates example interfaces 406, 410 with masks 408, 412 inserted over identified objects (e.g., a face of an individual and a license plate) to hide the identified objects in the video stream sequence.

Figure 4D:
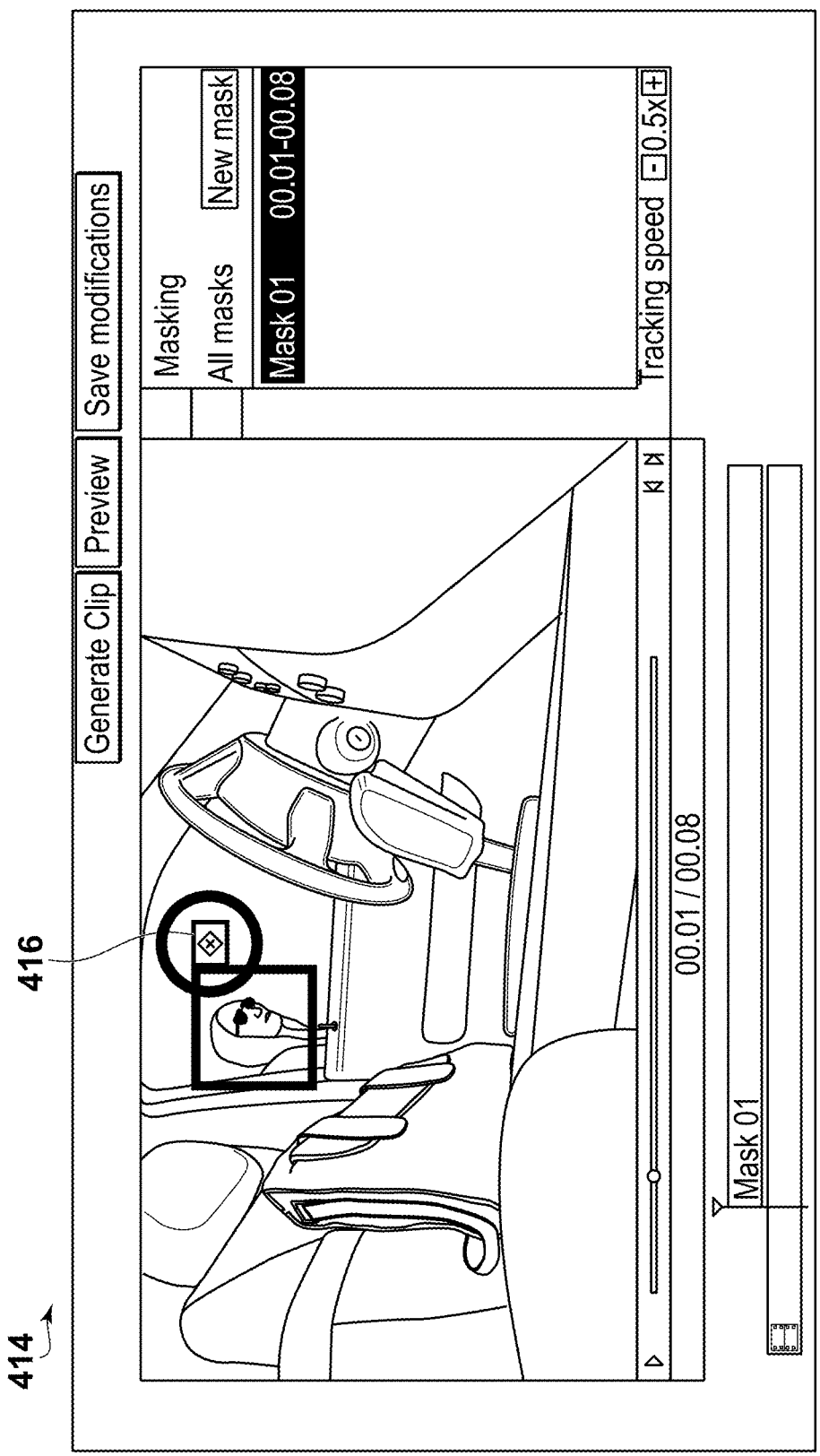
Figure 4E:
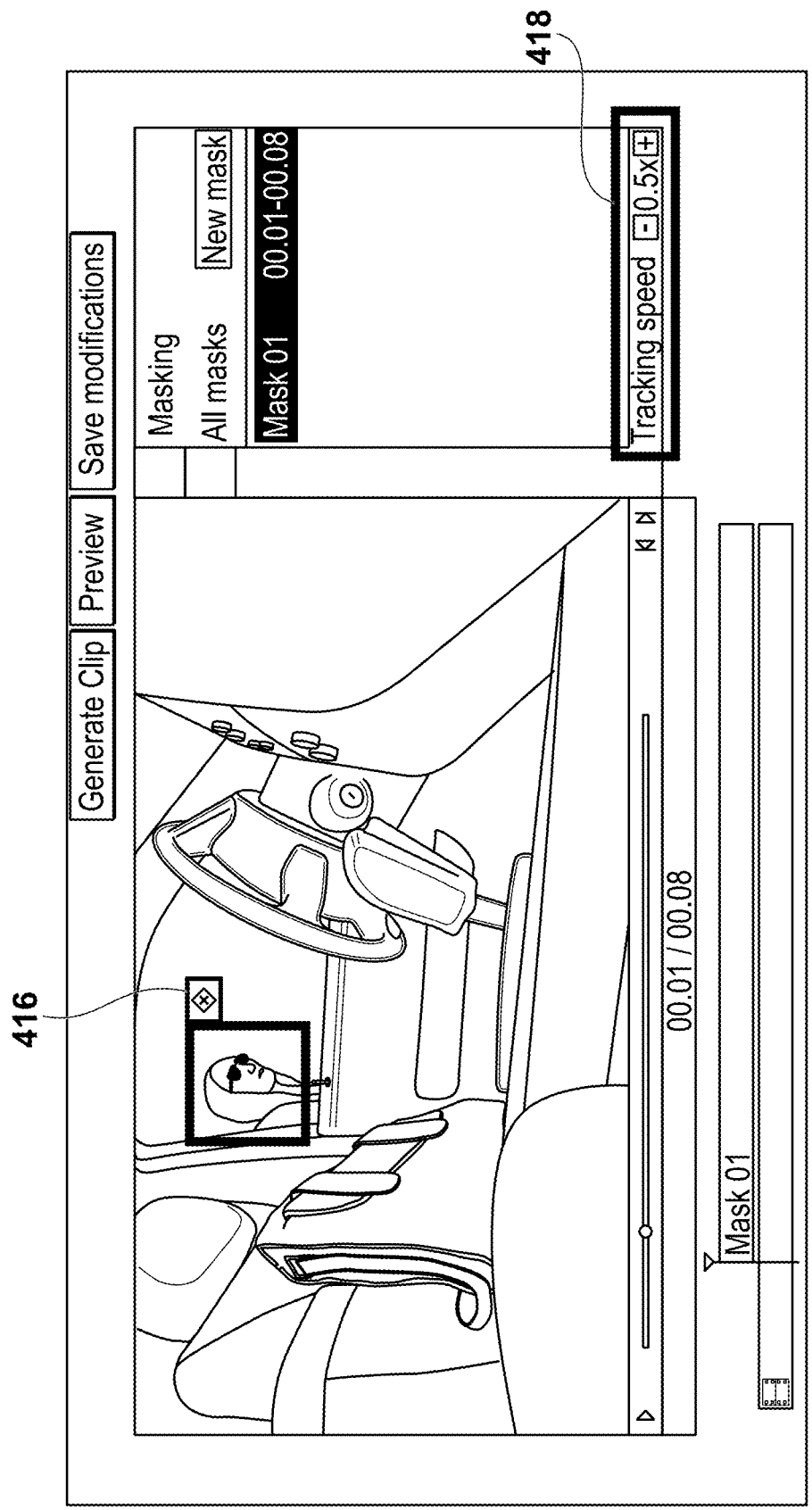
Figure 4F:
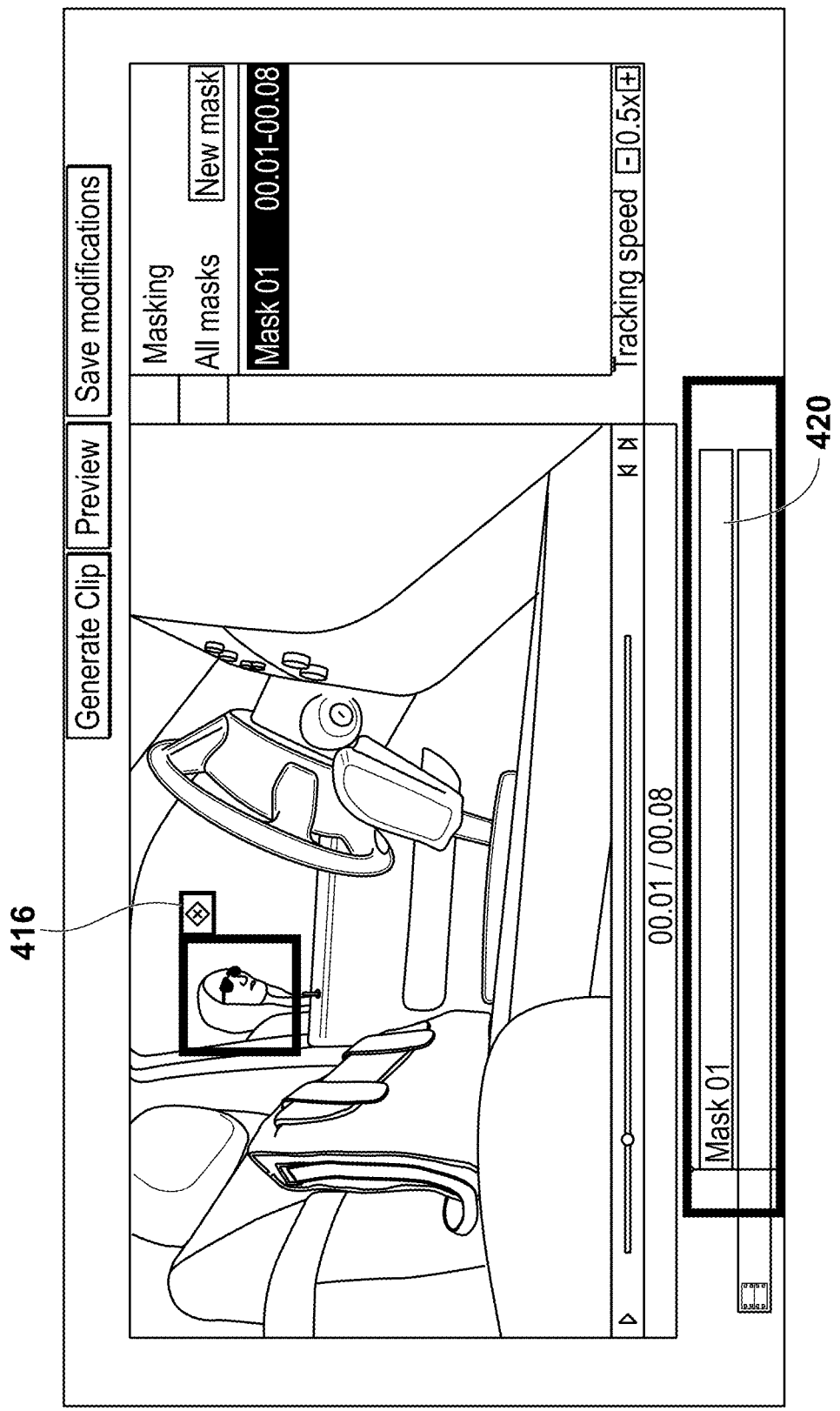
Figure 4G:
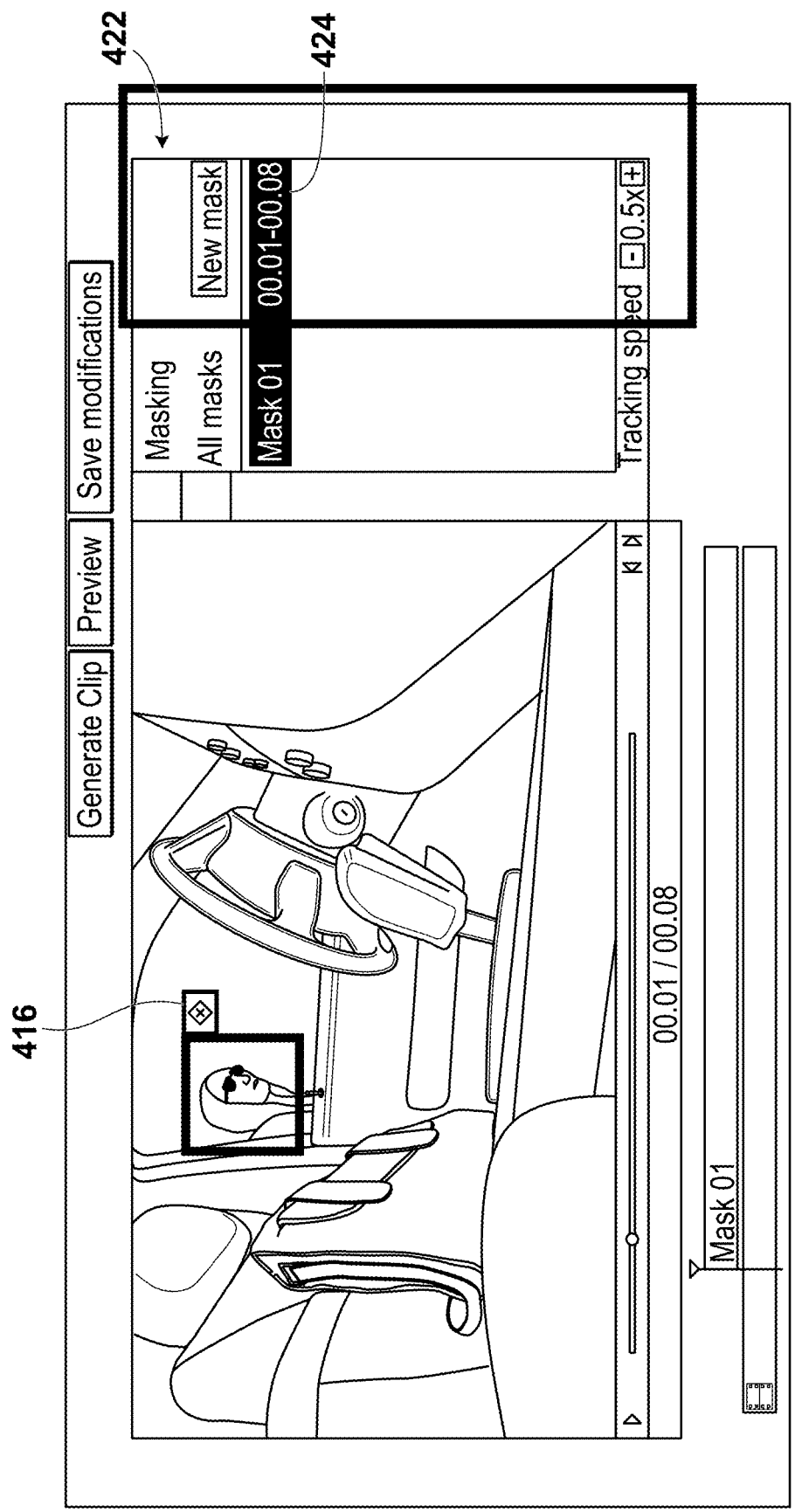
Figure 4H:
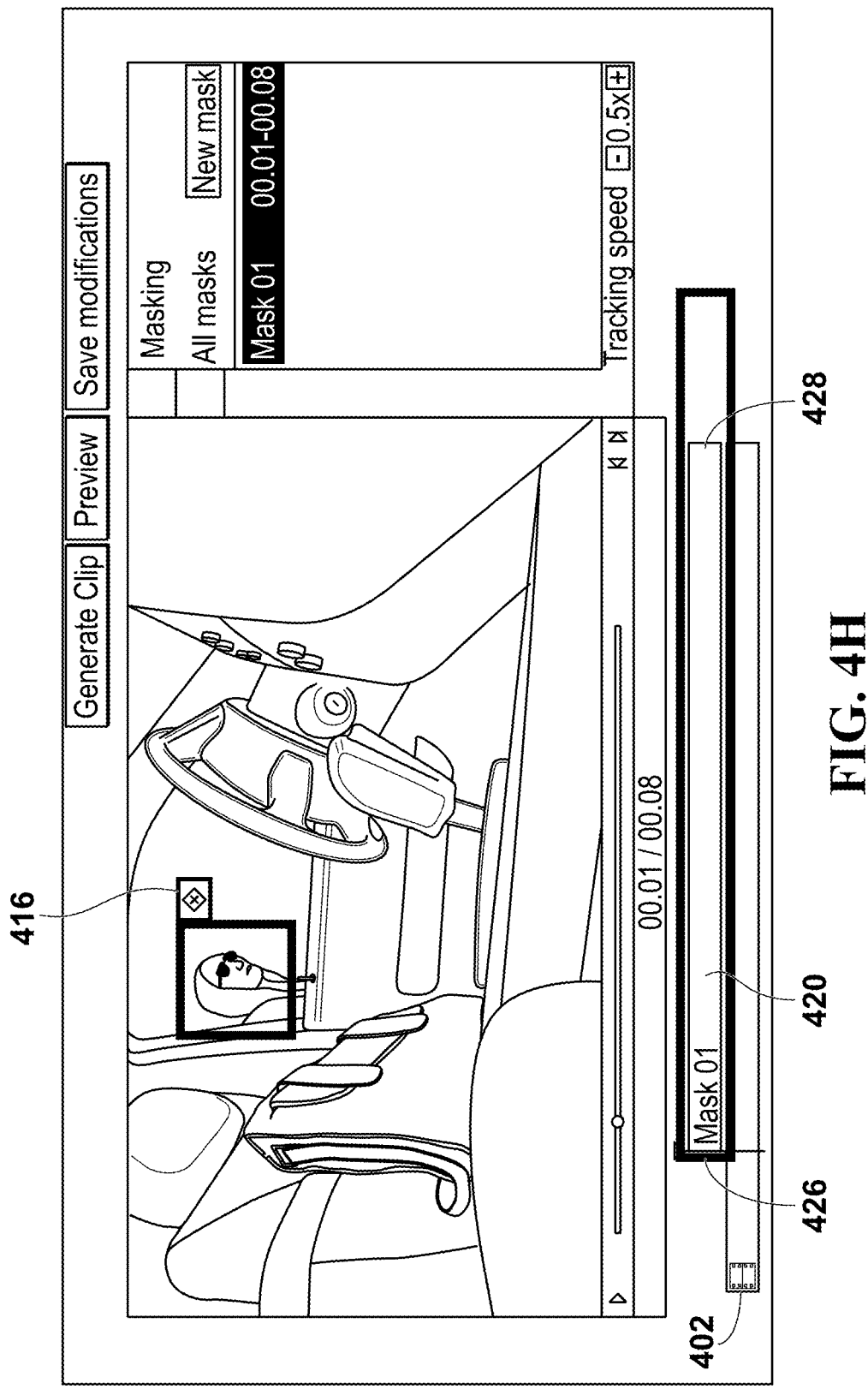

FIG. 4D illustrates an example interface 414 with a tracking icon, such as a "Manual Live Tracking" button 416 (further illustrated in FIG. 4H). Once a user selects the tracking icon 416 (e.g., by touching the tracking icon 416 on the screen and/or pressing a mouse button), and maintains the selection of the tracking icon 416, the video starts playing at the speed specified in the tracking speed menu 418 illustrated in FIG. 4E. In this example, the video plays at half its original speed.

As long as the user continues to select the tracking icon 416, the video may continue to play. The user may move the pointer (e.g., via mouse or finger) and the mask will move so as to follow the same path as the pointer. As such, the user may follow with the pointer (e.g., mouse or finger) the moving object to be masked. The user may also resize the mask without pausing the video by pressing predetermined shortcut keys, for example, to increment and decrement the width and height to the mask by a predetermined amount (e.g., 5%).

FIG. 4F illustrates a timeline 420 indicating (e.g., in blue) the length of the video and (e.g., in green) the mask duration (e.g., a length of time during which the selected mask is displayed from a start time to an end time). When a new mask is added by default, an end time may be set to the end of the video. A user may modify the end time by releasing the tracking icon 416 and/or moving the end of timeline 420, for example.

FIG. 4G illustrates on the right side of the video that a user may select to view a list 422 of the created mask with the one selected highlighted 424 (e.g., in green). Each line shows the mask's name, its start time and its end time. A mask selection can be toggled by clicking or otherwise selecting the line corresponding to the mask on the right side of the video player or by clicking or otherwise selecting a mask directly in the video player. When a user selects a different mask, a timeline 420 (FIG. 4F) may be displayed for the corresponding mask, and the tracking icon 416 may be selected so that the mask may be updated and/or moved.

As shown in FIG. 4H, a user is able to set the start time and the end time of the mask, which respectively correspond to the first and to the last moment within the video stream that the mask is displayed. For example, a user may drag, or otherwise move, both sides 426, 428 of the mask timeline 420 under the video (e.g., in green; or the one above the video timeline 402).

Figure 5A:
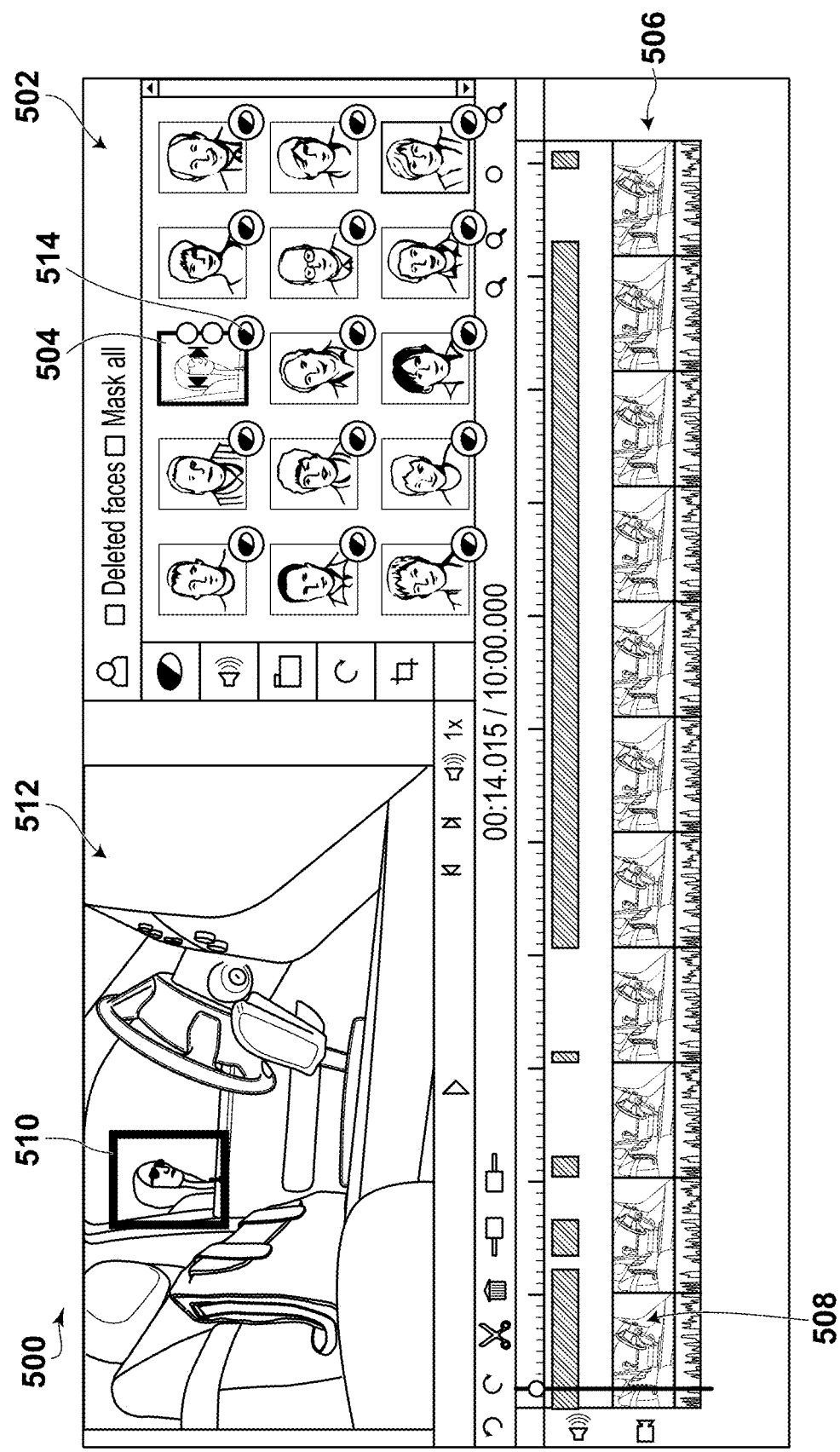
FIGS. 5A-5F illustrate example graphical user interfaces in accordance with aspects of the present disclosure.

Referring now to FIGS. 5A-5F, additional example snapshots of user interface screens are illustrated. For example, FIG. 5A illustrates an example user interface screen 500 that may be presented when video editor application 14 (FIG. 1) opens. For example, interface screen 500 may present a list 502 of detected faces of individuals automatically identified in a video stream using, for example, an automatic face recognition tool and/or object recognition tool. In addition, interface screen 500 may present a series of thumbnails 506 with previews of image frames of the video stream. A user may select an individual 504, e.g., person 3, from the list 502 of detected individuals. When a user selects an individual 504, an image frame 508 with the first appearance of the selected individual 504 may be highlighted in the series of thumbnails 506. A user may select a thumbnail associated with image frame 508, and the image frame 508 may then be presented on the left side 512 of interface 500 as shown in FIG. 5A. In addition, a mask 510 may be automatically inserted into the image frame 508 for covering the face of the selected individual 504 (e.g., person 3), for example. A user may select an edit mask icon 514 to edit the mask associated with selected individual 504.

Figure 5B:
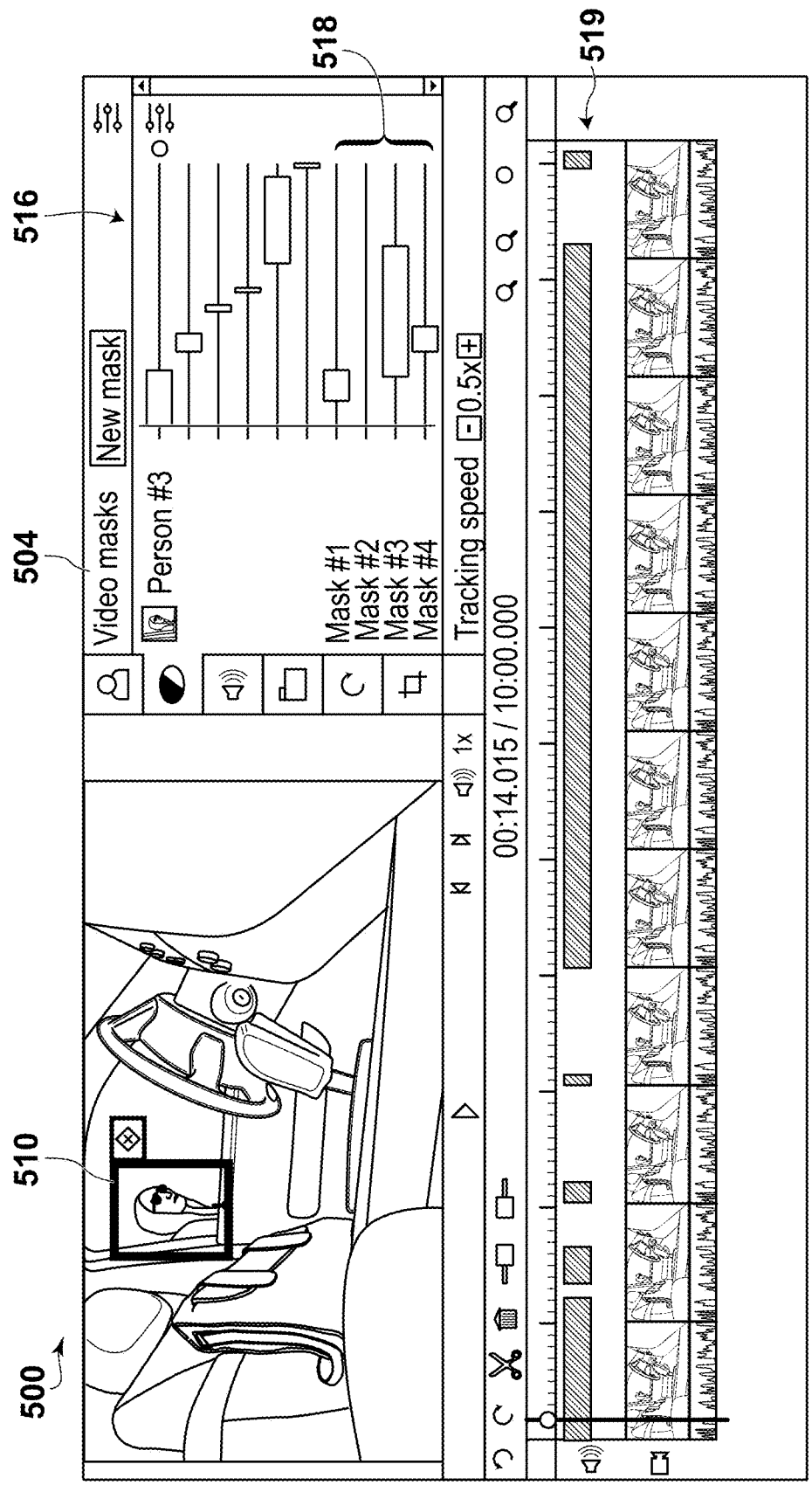

FIG. 5B illustrates an example user interface screen 500 when a user selects edit mask icon 514. A video mask tab 516 may open with the mask corresponding to the selected individual 504. Previously created masks 518 (e.g., Mask #1, Mask #2, and Mask #3) may be manually created and may be presented below the automatically created masks (e.g., Mask Person #3, 504). The previously created masks 518 may be presented in order, for example, by start time in the video stream, with the mask corresponding to the earliest start time relative to the other start times presented first. In addition, a mask duration timeline 519 may be presented that identifies a duration of the mask 510 (e.g., by corresponding color or other identifier) and locations in the video stream where the mask 510 is inserted.

Figure 5C:
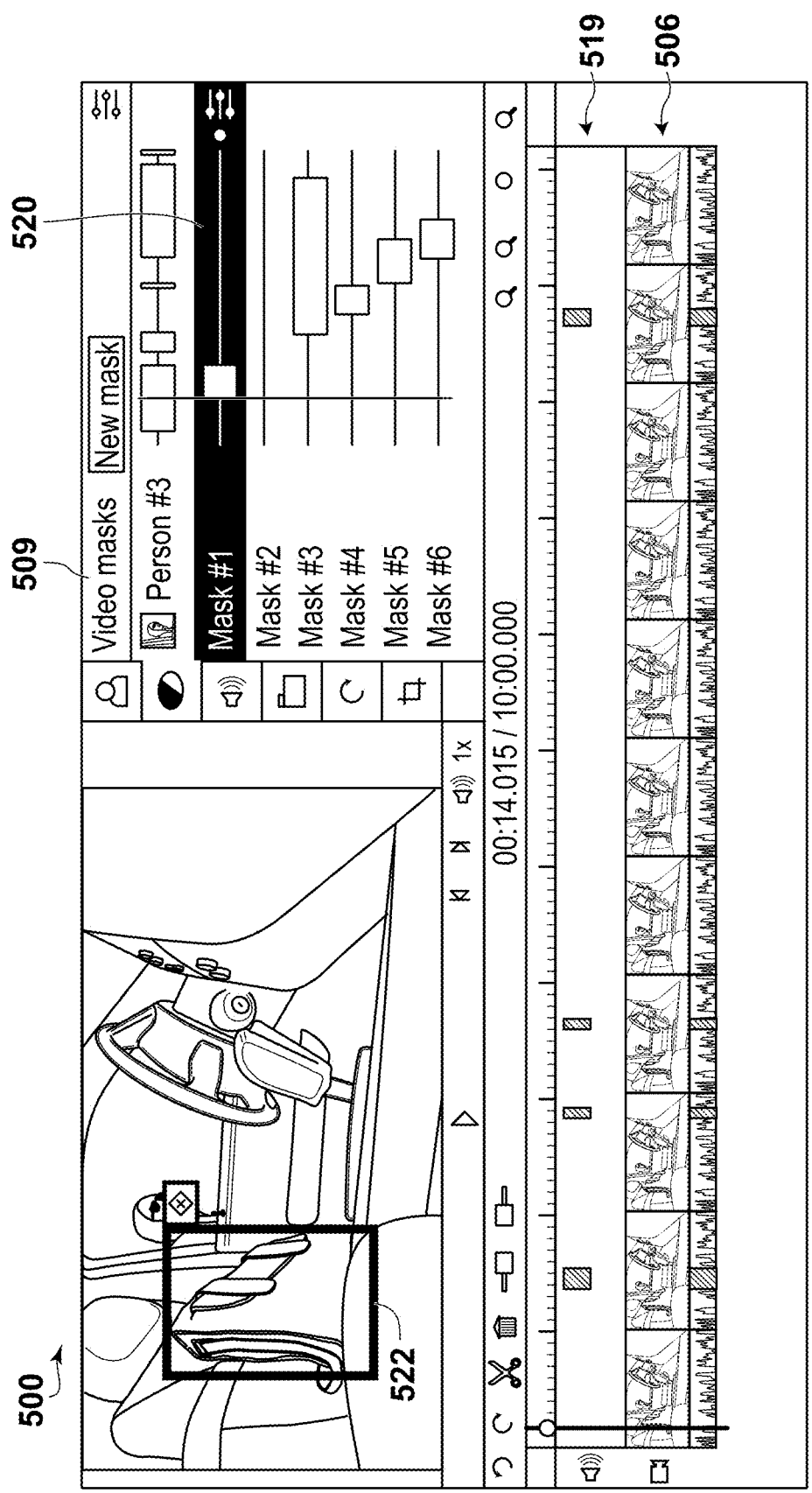

FIG. 5C illustrates an example user interface screen 500 when a user selects a different mask 520 to view. The mask 510 associated with the selected individual 504 may be collapsed, and the mask 522 associated with newly selected mask 520 may be presented in the image frame. In addition, mask duration timeline 519 may be updated to illustrate the duration of mask 522 and the locations in the video stream where mask 522 is inserted, for example.

In an example implementation, among other things, a user may use the mask duration timeline 519 to view a preview of the video. For example, a user may select a start of a mask duration, and a preview of the video where the mask is first present in the video may be highlighted in the panel of thumbnails 506. In addition, a user may select an end of the mask duration, and a preview of the video of the end of the mask may be highlighted in the panel of thumbnails 506.

Figure 5D:
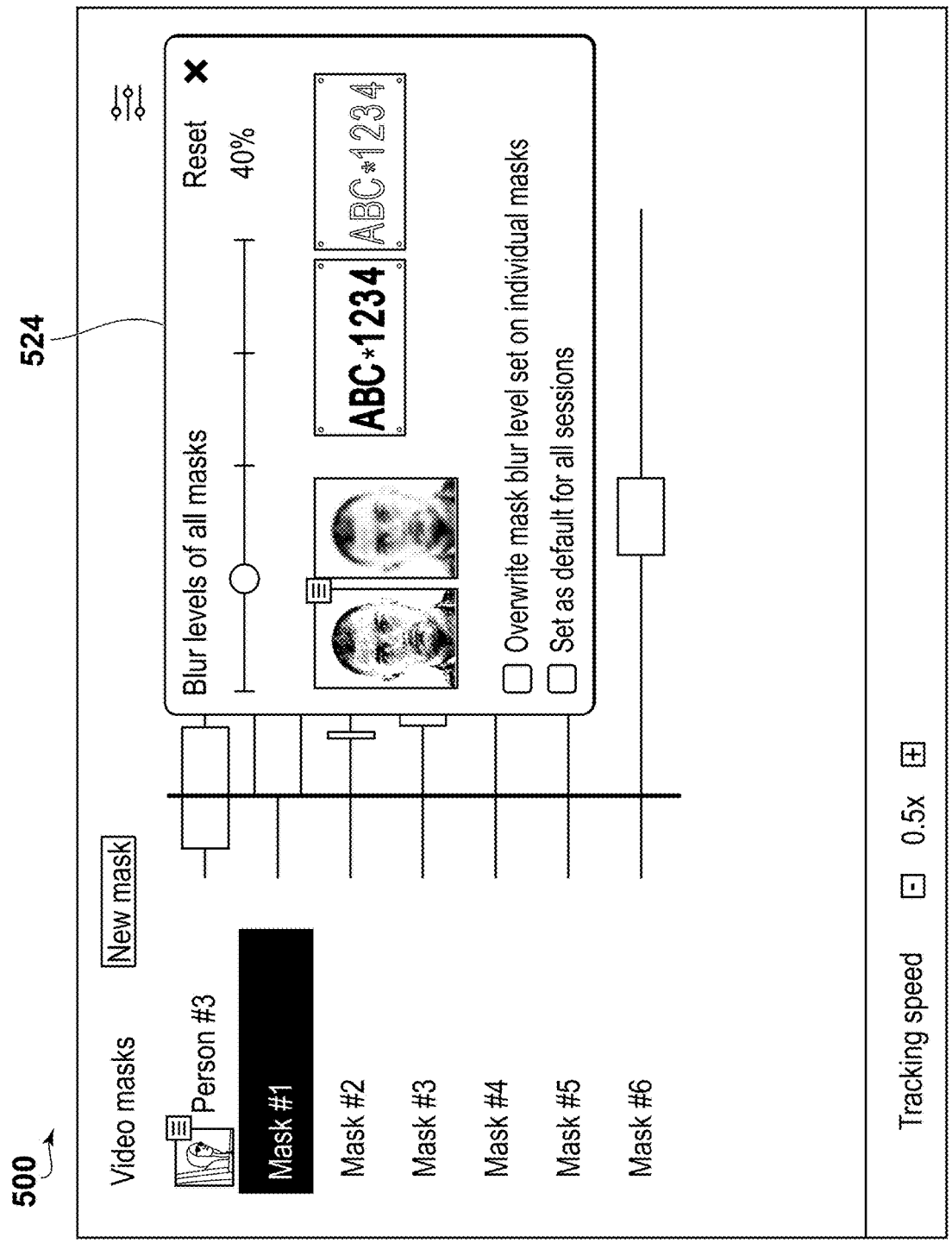

FIG. 5D illustrates an example user interface screen 500 when a user selects to adjust a blur level of one or more masks in the video. For example, a user may use a blur adjustment scale 524 to modify the blur level of the masks in the video. In an example implementation, the user may adjust the level of blur between a 20% blur level and a 100% blur level, where the percentage indicates a level of obstruction in the image. The blur adjustment scale 524 may allow a user to adjust the blur level by 20% increments, for example. In another implementation, a user may be able to adjust the blur level of the masks when viewing the final video stream copy.

Figure 5E:
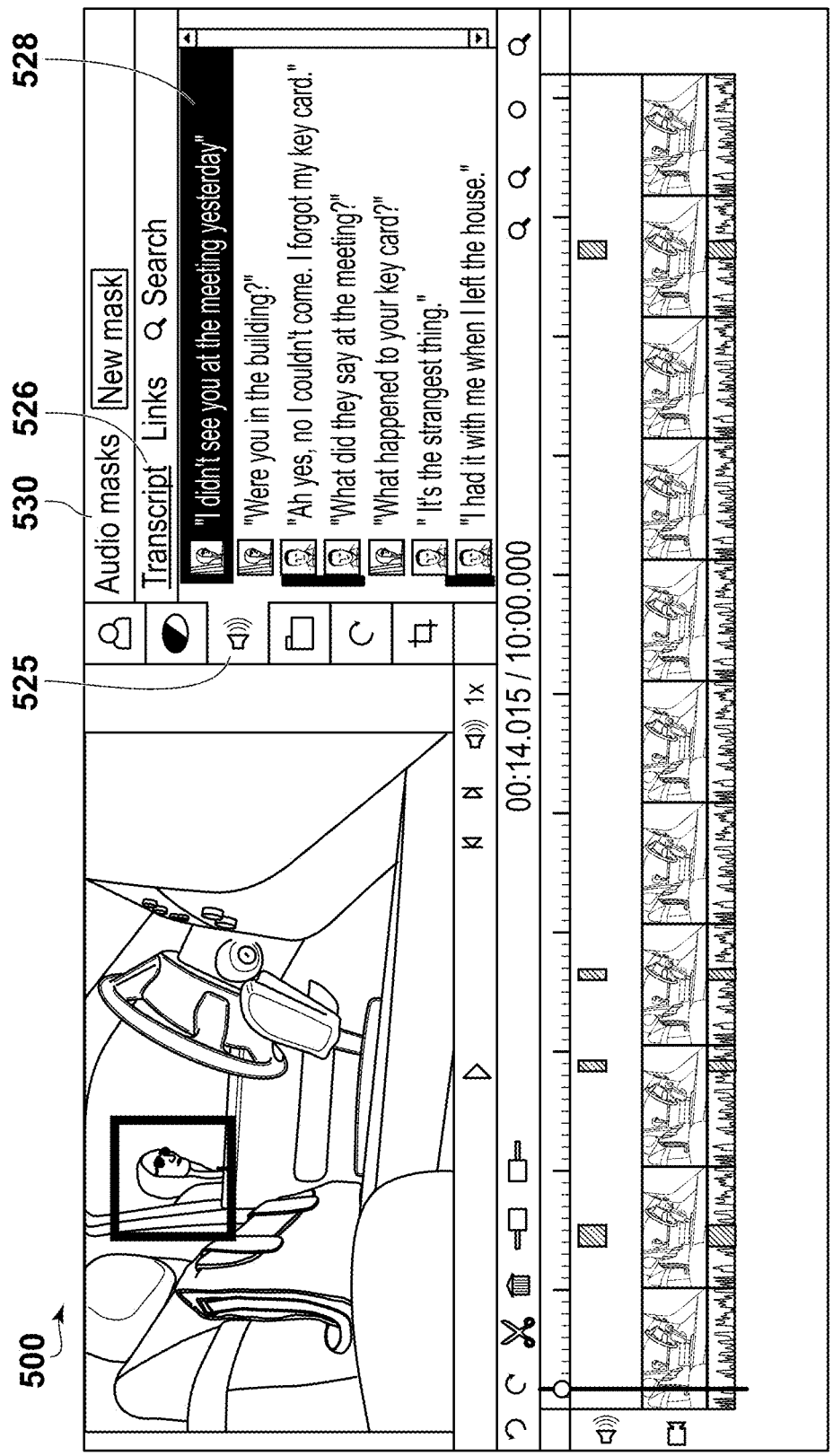

FIG. 5E illustrates an example user interface screen 500 when a user selects to edit audio associated with a video. A user may select an audio icon 525 to receive a transcript 526 of the audio associated with the video. The transcript 526 may identify various speakers and associate the audio with various speakers (e.g., by color or other identifier). For example, the system may convert the audio to text using one or more known methods to provide a transcript 526 of the captured audio. A user may select audio 528 to edit and/or redact. Once a user selects a portion of the audio 528 to edit, a user may select an audio mask icon 530 to apply a mask to the selected audio 528.

Figure 5F:
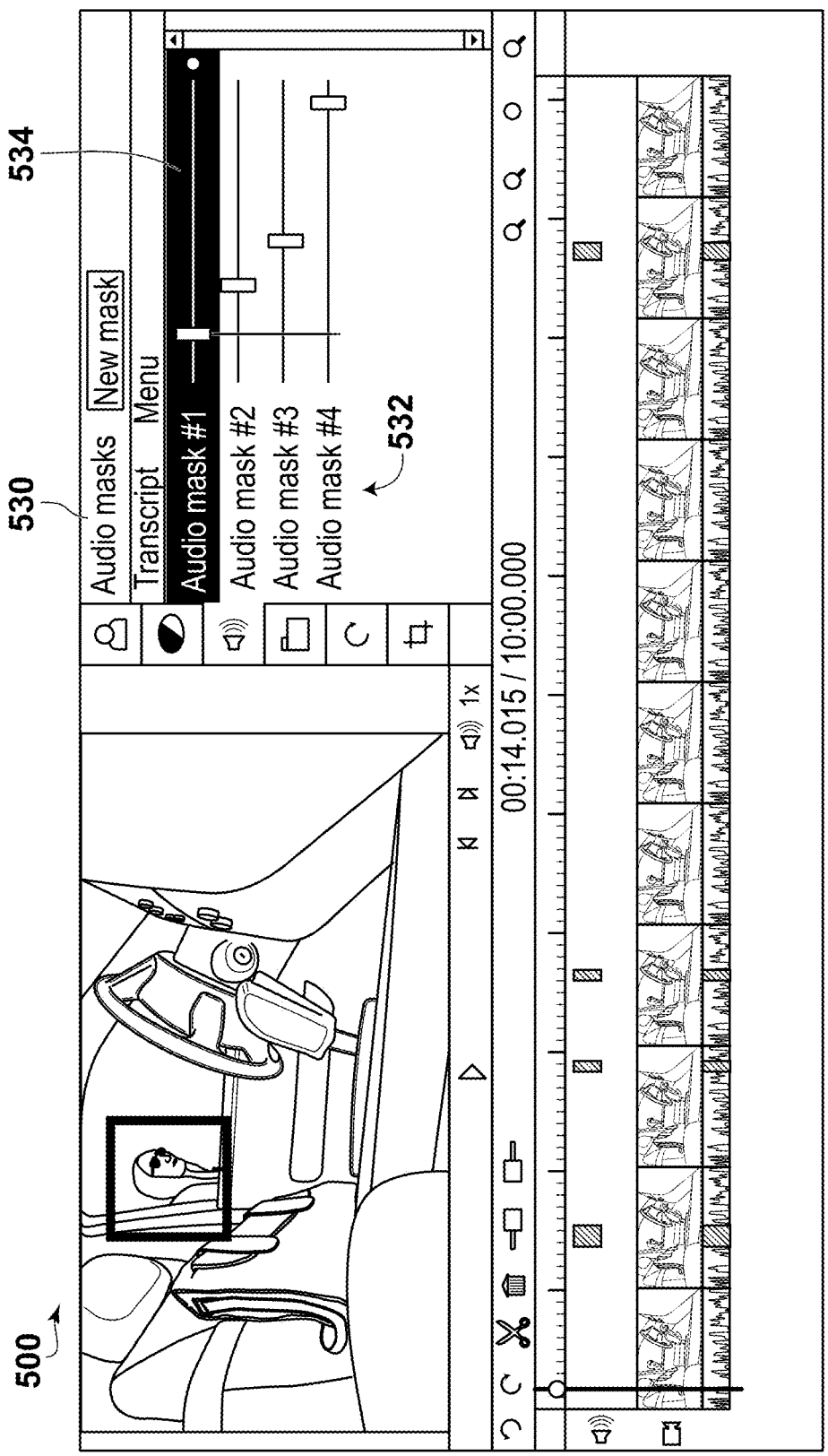

FIG. 5F illustrates an example user interface screen 500 when a user selects the audio mask icon 530. User interface screen 500 may present a list of audio masks 532 that have been created. A user may select an audio mask 534 to edit (e.g., audio mask #1). When a user selects audio mask 534 to edit, an audio mask timeline 536 may be presented so that a user may easily identify where audio mask 534 may be inserted in the audio file. The audio mask 534 may be used to remove the audio from the audio file and/or modify the audio so that the audio is unrecognizable. When placing audio mask 534 into the video, the audio may stop one second prior to the location where the audio mask 534 may be inserted, for example, to aid in the placement of the audio mask 534.

An example implementation will now be provided with pseudocode, which is meant to illustrate, not limit, the described methods and devices. Among other things, the pseudo-code explains in further details example logic used for the "Manual live tracking" functionality once a user activate the functionality on a mask as described in the "Step-by-step of the method" section of this document at the step of FIG. 4D. The example implementation also explains one example of the behavior of the system when the user plays back a video:

If the user activates the «manual live tracking» functionality on a mask,
    While the user keeps the functionality activated,
        Start playing the video at a playback speed adjustable by the user (i.e., by default at half the original speed of the video).
        At every predetermined interval of time Z set in the system (i.e., every 1/30 of a second).
            Check if the last recording for the mask does not indicate the same X and Y positions for the mask as the ones of the user pointer right now (plus some deltas for the X and Y positions of the pointer to take into account the fact the user pointer is not positioned at the center of the mask) OR check if there is no any last recording for the mask,
                If that is the case, create a new recording for the mask indicating that at the current time, the X and Y positions of the mask changed to the ones of the user pointer right now (plus some deltas for the X and Y positions of the pointer to take into account the fact the user pointer is not positioned at the center of the mask).
            Check if the last recording for the mask does not indicate the same dimensions for the mask (width and height) as the ones specified by the user right now OR check if there is not any last recording for the mask,
                If that is the case, create a new recording for the mask indicating that, at the current time, the width and height of the mask changed to the ones the user specified.
If the user plays back the video,
    At every predetermined interval of time Z set in the system (i.e., every 1/30 of a second)
        For every mask.
            Check if the mask is to be displayed at the current time (if its start time is smaller than the current time and its end time is greater than the current time).
                If that is the case, find the latest recording for the mask that has been recorded at the current time of the video or earlier. Display the mask over the video with the dimensions and at the X and Y positions specified in the latest recording
                If that is not the case, hide the mask if it was displayed.

Figure 6:
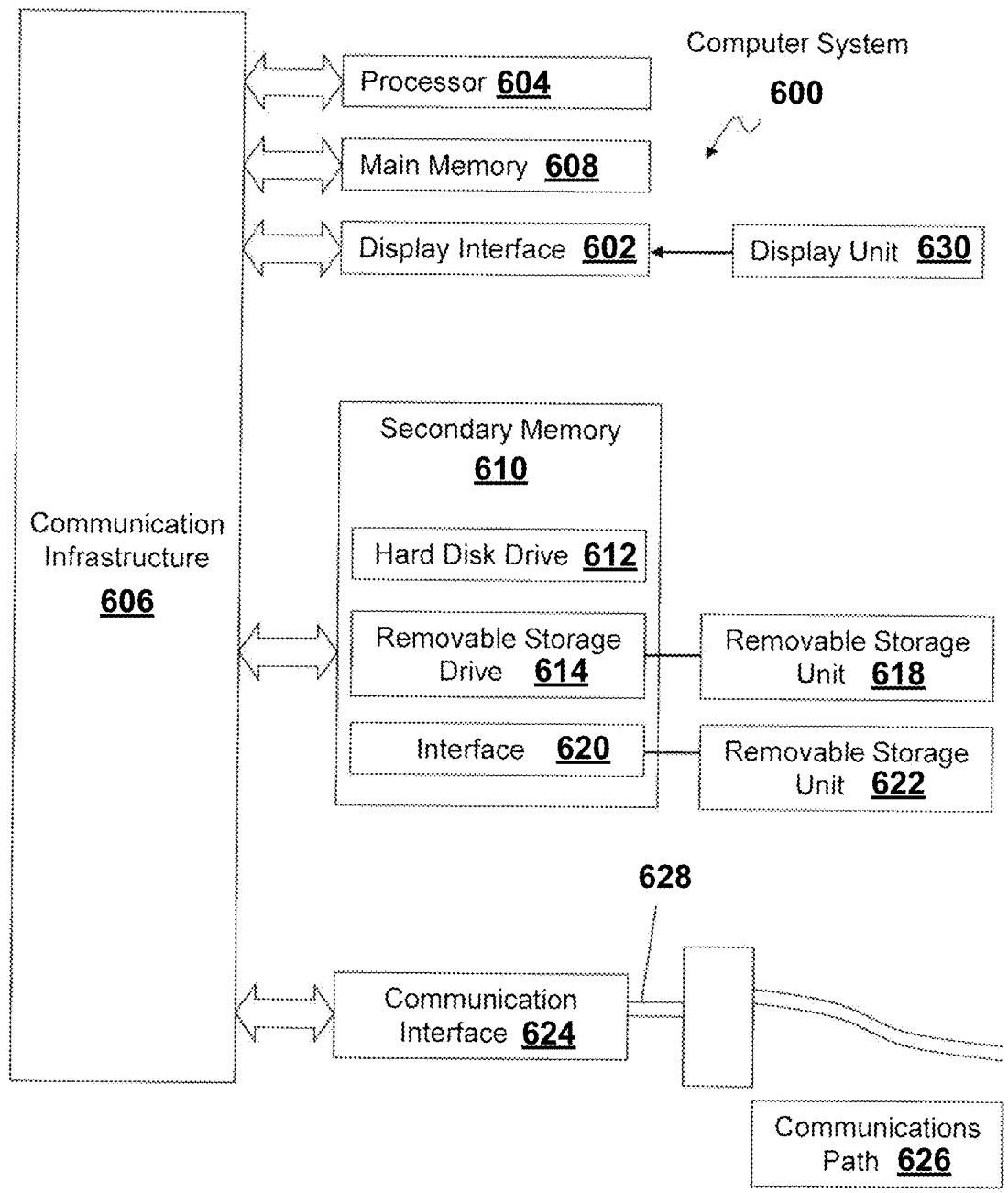
FIG. 6 is a diagram illustrating various features of an example computer system for use in conjunction with aspects of the present disclosure.

Aspects of the present disclosure may be implemented using hardware, software executed by a processor, or a combination thereof and may be implemented in one or more computer systems or other processing systems. For example, the user interfaces illustrated in FIGS. 4A-4H and 5A-5F may be implemented as a computer system or processing system. Also, the video editor application 14 (FIG. 1) may be implemented as a computer system or processing system. In an aspect of the present disclosure, various features may be directed toward one or more computer systems capable of carrying out the functionality described herein. An example of such a computer system 600 is shown in FIG. 6.

Computer system 600 includes one or more processors, such as processor 604. The processor 604 is coupled to a communication infrastructure 606 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 600 may include a display interface 602 that forwards graphics, text, and other data from the communication infrastructure 606 (or from a frame buffer not shown) for display on a display unit 630. Computer system 600 may include a main memory 608, preferably random access memory (RAM), and may also include a secondary memory 610. The secondary memory 610 may include, for example, a hard disk drive 612 and/or a removable storage drive 614, e.g., an optical disk drive. The removable storage drive 614 may read from and/or write to a removable storage unit 618 in a well-known manner. As will be appreciated, the removable storage unit 618 may include a computer readable storage medium having stored therein computer software and/or data.

Alternative aspects of the present invention may include secondary memory 610 and may include other similar devices for allowing computer programs or other instructions to be loaded into computer system 600. Such devices may include, for example, a removable storage unit 622 and an interface 620. Examples of such may include a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 may allow software and data to be transferred among computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 may be in the form of signals 628, which may be electronic, electromagnetic, optical or other signals capable of being received by communications interface 624. These signals 628 may be provided to communications interface 624 via a communications path (e.g., channel) 626. This path 626 may carry signals 628 and may be implemented using wire or cable, fiber optics, a telephone line, a cellular link, a radio frequency (RF) link and/or other communications channels. As used herein, the terms "computer readable medium," "computer program medium," and "computer usable medium" refer generally to media such as a removable storage drive 680, and/or a hard disk installed in hard disk drive 670. These computer program products may provide software to the computer system 600. Aspects of the present invention are directed to such computer program products.

Computer programs (also referred to as computer control logic) may be stored in main memory 608 and/or secondary memory 610. Computer programs may also be received via communications interface 624. Such computer programs, when executed, may enable the computer system 600 to perform the features in accordance with aspects of the present invention, as discussed herein. In particular, the computer programs, when executed, may enable the processor 604 to perform the features in accordance with aspects of the present invention. Accordingly, such computer programs may represent controllers of the computer system 600.

Where aspects of the present invention may be implemented using software, the software may be stored in a computer program product and loaded into computer system 600 using removable storage drive 614, hard disk drive 612, or interface 620. The control logic (software), when executed by the processor 604, may cause the processor 604 to perform the functions described herein. In another aspect of the present disclosure, the system may be implemented primarily in hardware using, for example, hardware components, such as application specific integrated circuits (ASICs). Implementation of the hardware state machine so as to perform the functions described herein will be apparent to persons skilled in the relevant art(s). In yet another variation, aspects of the present disclosure may be implemented using a combination of both hardware and software.

In yet another aspect of the disclosure, the invention may be implemented using a combination of both hardware and software.

Figure 7:
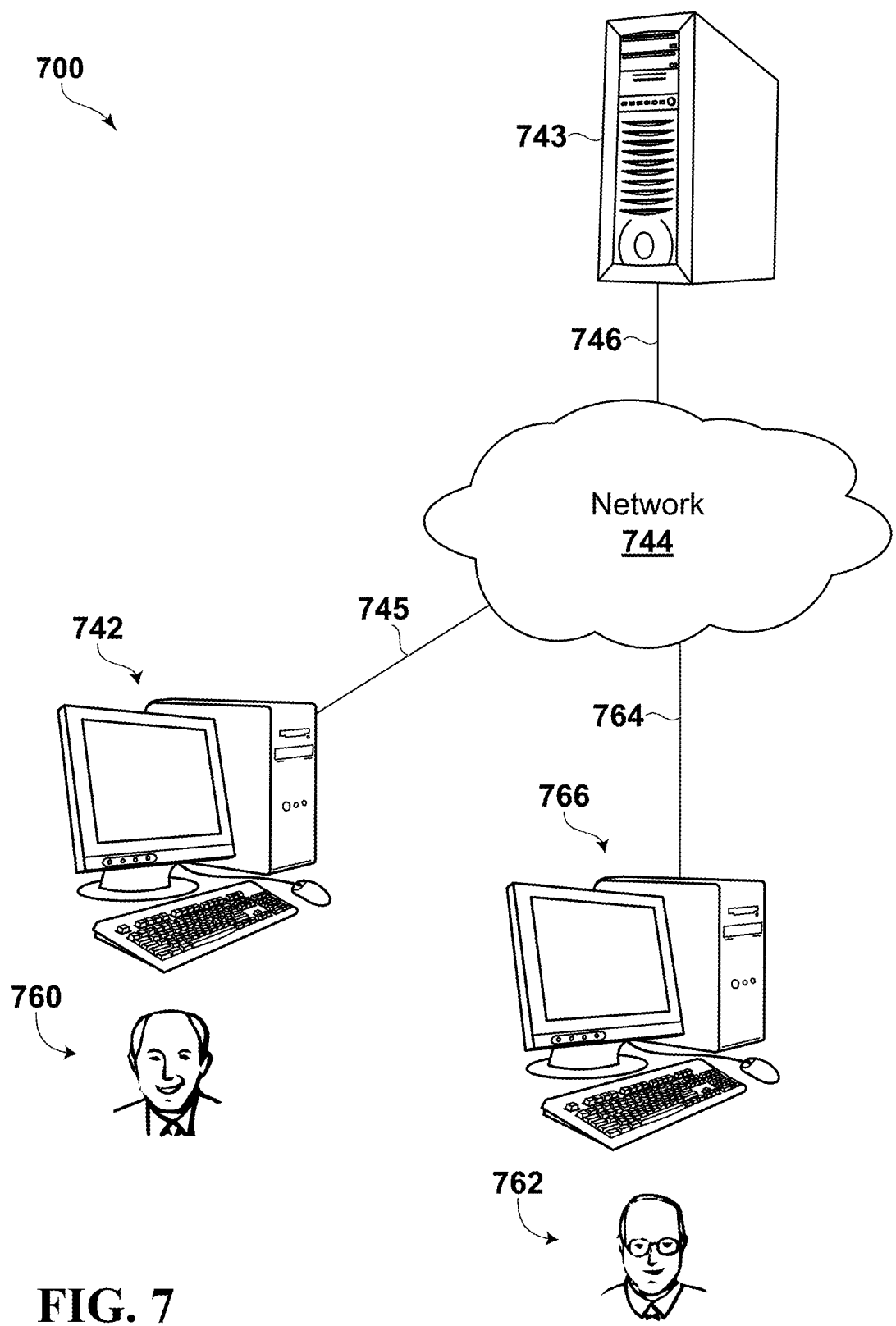
FIG. 7 illustrates an example system diagram of various hardware components and other features for use in accordance with aspects of the present disclosure.

FIG. 7 shows various elements of an example network 700 usable in accordance with aspects of the disclosure. The network 700 includes one or more accessors 760, 762 (also referred to interchangeably herein as one or more "users") and one or more terminals 742, 766. In one aspect of the disclosure, data for use is, for example, input and/or accessed by accessors 760, 762 via terminals 742, 766, such as personal computers (PCs), minicomputers, mainframe computers, microcomputers, telephonic devices, or wireless devices, personal digital assistants ("PDAs") or a hand-held wireless devices (e.g., wireless telephones) coupled to a server 743, such as a PC, minicomputer, mainframe computer, microcomputer, or other device having a processor and a repository for data and/or connection to a repository for data, via, for example, a network 744, such as the Internet or an intranet, and/or a wireless network, and couplings 745, 746, 764. The couplings 745, 746, 764 may include, for example, wired, wireless, or fiberoptic links. In another aspect of the disclosure, the method and system of the disclosure may include one or more features that operate in a stand-alone environment, such as on a single terminal.

While implementations of various aspects of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method for combining a mask with a video stream, the method comprising:

receiving a selection to emplace a mask with a size at a first location within a video stream, the mask comprising a mask zone that outlines or obscures at least a portion of an object visible within the video stream;

receiving a selection to automatically track movement of the at least a portion of the object with the mask while the at least a portion of the object is visible in the video stream;

adjusting the size of the mask while the video stream progresses; and generating a combined output of the video stream and the mask as emplaced and moved with the at least a portion of the object while the at least a portion of the object is visible in the video stream.

2. The method of claim 1, wherein receiving the selection to emplace the mask at the first location within the video stream comprises receiving the selection to emplace the mask at the first location within the video stream when the video stream is paused.

3. The method of claim 2, further comprises receiving an input to resume playing the video stream.

4. The method of claim 2, further comprising linking movement of the mask to the movement of the at least a portion of the object.

5. The method of claim 2, further comprising receiving an input to adjust the size of the mask zone of the mask when the video stream is paused.

6. The method of claim 1, wherein generating the combined output comprises at least in part obscuring one or more image frames of the video stream or a copy of the video stream according to the mask as emplaced and moved with the at least a portion of the object.

7. The method of claim 1, wherein generating the combined output comprises playing the video stream with the mask tracking the movement of the at least a portion of the object during video stream progression.

8. The method of claim 7, wherein, during the playing, the mask zone is displayed as comprising a square or rectangular shaped outline.

9. The method of claim 1, wherein receiving the selection to automatically track movement comprises receiving the selection to automatically track movement via an icon associated with the mask.

10. The method of claim 1, wherein receiving the selection to automatically track movement of the at least a portion of the object with the mask comprises receiving a selection of the mask.

11. The method of claim 1, further comprising presenting a mask duration timeline corresponding to a duration of time when the mask is present in the video stream in response to receiving the selection to emplace the mask at the first location within the video stream.

12. The method as defined in claim 1, wherein the adjusting the size of the mask while the video stream progresses is performed following receipt of user input to resize the mask.

13. The method as defined in claim 1, wherein the adjusting the size of the mask while the video stream progresses is performed automatically by tracking the at least one portion of the object in the video stream.

14. A computer device, comprising:

at least one processor;

at least one non-transitory computer-readable memory having stored thereon instructions executable by the at least one processor for:

receiving a selection to emplace a mask with a size at a first location within a video stream, the mask comprising a mask zone that outlines or obscures at least a portion of an object visible within the video stream;

receiving a selection to automatically track movement of the at least a portion of the object with the mask while the at least a portion of the object is visible in the video stream;

adjusting the size of the mask while the video stream progresses; and generating a combined output of the video stream and the mask as emplaced and moved with the at least a portion of the object while the at least a portion of the object is visible in the video stream.

15. The computer device of claim 14, wherein receiving the selection to emplace the mask at the first location within the video stream comprises receiving the selection to emplace the mask at the first location within the video stream when the video stream is paused.

16. The computer device of claim 15, wherein the instructions are further executable by the at least one processor for receiving an input to resume playing the video stream.

17. The computer device of claim 15, wherein the instructions are further executable by the at least one processor for linking movement of the mask to the movement of the at least a portion of the object.

18. The computer device of claim 15, wherein the instructions are further executable by the at least one processor for receiving an input to adjust the size of the mask zone of the mask when the video stream is paused.

19. The computer device of claim 14, wherein generating the combined output comprises at least in part obscuring one or more image frames of the video stream or a copy of the video stream according to the mask as emplaced and moved with the at least a portion of the object.

20. The computer device of claim 14, wherein generating the combined output comprises playing the video stream with the mask tracking the movement of the at least a portion of the object during video stream progression.

21. The computer device of claim 20, wherein, during the playing, the mask zone is displayed as comprising a square or rectangular shaped outline.

22. The computer device of claim 14, wherein receiving the selection to automatically track movement comprises receiving the selection to automatically track movement via an icon associated with the mask.

23. The computer device of claim 14, wherein receiving the selection to automatically track movement of the at least a portion of the object with the mask comprises receiving a selection of the mask.

24. The computer device of claim 14, wherein the instructions are further executable by the at least one processor for presenting a mask duration timeline corresponding to a duration of time when the mask is present in the video stream in response to receiving the selection to emplace the mask at the first location within the video stream.

25. The computing device as defined in claim 14, wherein the adjusting the size of the mask while the video stream progresses is performed following receipt of user input.

26. The computing device as defined in claim 14, wherein the adjusting the size of the mask while the video stream progresses is performed automatically by tracking the at least one portion of the object in the video stream.

27. A non-transitory computer-readable medium storing instructions executable by a computer device, comprising:
at least one instruction for causing the computing device to receive a selection to emplace a mask with a size at a first location within a video stream, the mask comprising a mask zone that outlines or obscures at least a portion of an object visible within the video stream;
at least one instruction for causing the computing device to receive a selection to automatically track movement of the at least a portion of the object with the mask while the at least a portion of the object is visible in the video stream;
at least one instruction for causing the computing device to adjust the size of the mask while the video stream progresses; and
at least one instruction for causing the computing device to generate a combined output of the video stream and the mask as emplaced and moved with the at least a portion of the object while the at least a portion of the object is visible in the video stream.

* * * * *